US012551703B2

(12) United States Patent
Haddock et al.

(10) Patent No.: US 12,551,703 B2
(45) Date of Patent: Feb. 17, 2026

(54) ADAPTIVE DEEP BRAIN STIMULATION BASED ON NEURAL SIGNALS WITH DYNAMICS

(71) Applicant: Boston Scientific Neuromodulation Corporation, Valencia, CA (US)

(72) Inventors: Andrew Haddock, Los Angeles, CA (US); Mahsa Malekmohammadi, Sherman Oaks, CA (US); G. Karl Steinke, Valencia, CA (US)

(73) Assignee: Boston Scientific Neuromodulation Corporation, Valencia, CA (US)

( * ) Notice: Subject to any disclaimer, the term of this patent is extended or adjusted under 35 U.S.C. 154(b) by 553 days.

(21) Appl. No.: 18/069,034

(22) Filed: Dec. 20, 2022

(65) Prior Publication Data
US 2023/0201597 A1 Jun. 29, 2023

Related U.S. Application Data

(60) Provisional application No. 63/266,081, filed on Dec. 28, 2021.

(51) Int. Cl.
*A61N 1/36* (2006.01)
*A61N 1/05* (2006.01)

(52) U.S. Cl.
CPC ....... *A61N 1/36139* (2013.01); *A61N 1/0534* (2013.01); *A61N 1/36167* (2013.01)

(58) Field of Classification Search
CPC .............. A61N 1/36139; A61N 1/0534; A61N 1/36167; A61N 1/3606
See application file for complete search history.

(56) References Cited

U.S. PATENT DOCUMENTS

| 6,052,624 A | 4/2000 | Mann |
| 6,181,969 B1 | 1/2001 | Gord |
| 6,393,325 B1 | 5/2002 | Mann et al. |

(Continued)

FOREIGN PATENT DOCUMENTS

| AU | 2014351064 A1 | 6/2016 |
| AU | 2019216650 A1 | 9/2019 |

(Continued)

OTHER PUBLICATIONS

International Search Report and Written Opinion regarding corresponding PCT Application No. PCT/US2022/082055, mailed Apr. 3, 2023.

(Continued)

*Primary Examiner* — Niketa Patel
*Assistant Examiner* — Attiya Sayyada Hussaini
(74) *Attorney, Agent, or Firm* — Lewis & Reese, PLLC

(57) ABSTRACT

Methods and systems for providing stimulation to a patient's brain using one or more electrode leads implanted in the patient's brain are described. The methods and systems use evoked potentials (EPs) and other indicators of therapeutic effectiveness/side effects to provide closed-loop control of the stimulation. Some embodiments involve recording EPs and using one or more features of the EPs to model how the stimulation activates networks within the patient's brain. A control algorithm can be used to maintain the network activation within a predetermined ranges.

20 Claims, 8 Drawing Sheets

(56) References Cited

U.S. PATENT DOCUMENTS

| | | |
|---|---|---|
| 6,490,486 B1 | 12/2002 | Bradley |
| 6,609,032 B1 | 8/2003 | Woods et al. |
| 6,845,267 B2 | 1/2005 | Harrison et al. |
| 6,909,917 B2 | 6/2005 | Woods et al. |
| 6,950,707 B2 | 9/2005 | Whitehurst |
| 7,555,346 B1 | 6/2009 | Woods et al. |
| 7,582,062 B2 | 9/2009 | Magill et al. |
| 7,831,307 B1 | 11/2010 | Moffitt |
| 7,930,030 B2 | 4/2011 | Woods et al. |
| 8,121,701 B2 | 2/2012 | Woods et al. |
| 8,180,601 B2 | 5/2012 | Butson et al. |
| 8,265,762 B2 | 9/2012 | Woods et al. |
| 8,401,658 B2 | 3/2013 | Woods et al. |
| 8,606,362 B2 | 12/2013 | He et al. |
| 8,620,436 B2 | 12/2013 | Parramon et al. |
| 8,805,524 B2 | 8/2014 | Woods et al. |
| 8,812,124 B2 | 8/2014 | Lee |
| 8,855,773 B2 | 10/2014 | Kokones et al. |
| 8,868,193 B2 | 10/2014 | Ranu et al. |
| 8,868,196 B2 | 10/2014 | Lee et al. |
| 8,868,197 B2 | 10/2014 | Lee |
| 8,909,350 B2 | 12/2014 | Lee |
| 8,914,119 B2 | 12/2014 | Wu et al. |
| 8,958,615 B2 | 2/2015 | Blum et al. |
| 9,014,820 B2 | 4/2015 | Lee et al. |
| 9,050,473 B2 | 6/2015 | Woods et al. |
| 9,072,905 B2 | 7/2015 | Kokones et al. |
| 9,205,261 B2 | 12/2015 | Kim et al. |
| 9,248,280 B2 | 2/2016 | Moffitt et al. |
| 9,381,356 B2 | 7/2016 | Parker et al. |
| 9,387,328 B2 | 7/2016 | Lee |
| 9,387,334 B2 | 7/2016 | Lee et al. |
| 9,411,935 B2 | 8/2016 | Moffitt et al. |
| 9,511,231 B1 | 12/2016 | Kent et al. |
| 10,183,167 B2 | 1/2019 | Steinke et al. |
| 10,183,168 B2 | 1/2019 | Baru et al. |
| 10,195,439 B2 | 2/2019 | Steinke et al. |
| 10,207,113 B2 | 2/2019 | Lee et al. |
| 10,207,114 B2 | 2/2019 | Lee |
| 10,249,041 B2 | 4/2019 | Varkuti |
| 10,252,059 B2 | 4/2019 | Steinke et al. |
| 10,286,205 B2 | 5/2019 | Steinke et al. |
| 10,406,368 B2 | 9/2019 | Hershey et al. |
| 10,463,860 B2 | 11/2019 | Sinclair et al. |
| 10,549,097 B2 | 2/2020 | Zhang et al. |
| 10,576,292 B2 | 3/2020 | Orinski |
| 10,974,051 B2 | 4/2021 | Steinke et al. |
| 10,994,131 B2 | 5/2021 | Durand et al. |
| 11,020,004 B2 | 6/2021 | Varkuti |
| 11,123,563 B2 | 9/2021 | Mustakos et al. |
| 11,195,609 B2 | 12/2021 | Mustakos et al. |
| 11,344,732 B2 | 5/2022 | Moffitt et al. |
| 11,376,433 B2 | 7/2022 | Zhang et al. |
| 11,478,633 B2 | 10/2022 | Tinkhauser et al. |
| 2005/0065427 A1 | 3/2005 | Magill et al. |
| 2006/0224222 A1 | 10/2006 | Bradley et al. |
| 2007/0244407 A1 | 10/2007 | Osorio |
| 2009/0118786 A1 | 5/2009 | Meadows et al. |
| 2009/0118787 A1 | 5/2009 | Moffitt et al. |
| 2009/0192556 A1* | 7/2009 | Wu .................. A61B 5/1116 607/3 |
| 2009/0299421 A1 | 12/2009 | Sawchuk |
| 2010/0305660 A1 | 12/2010 | Hegi et al. |
| 2011/0105939 A1 | 5/2011 | Yong et al. |
| 2012/0046712 A1 | 2/2012 | Woods et al. |
| 2012/0092031 A1 | 4/2012 | Shi et al. |
| 2012/0095519 A1 | 4/2012 | Parramon et al. |
| 2012/0095529 A1 | 4/2012 | Parramon et al. |
| 2013/0289665 A1 | 10/2013 | Marnfeldt et al. |
| 2014/0163639 A1 | 6/2014 | Zhu |
| 2014/0243926 A1 | 8/2014 | Carcieri |
| 2014/0277282 A1 | 9/2014 | Jaax |
| 2014/0296737 A1 | 10/2014 | Parker et al. |
| 2014/0324117 A1* | 10/2014 | Bedenbaugh .......... A61N 1/0529 607/45 |
| 2014/0350634 A1 | 11/2014 | Grill et al. |
| 2014/0378941 A1 | 12/2014 | Su et al. |
| 2015/0039048 A1 | 2/2015 | Woods et al. |
| 2015/0066108 A1 | 3/2015 | Shi et al. |
| 2015/0080982 A1 | 3/2015 | Funderburk |
| 2015/0088228 A1 | 3/2015 | Moffitt |
| 2015/0157861 A1 | 6/2015 | Aghassian |
| 2015/0231402 A1 | 8/2015 | Aghassian |
| 2015/0360033 A1 | 12/2015 | Koubeissi et al. |
| 2015/0360038 A1 | 12/2015 | Zottola et al. |
| 2016/0045747 A1 | 2/2016 | Jiang et al. |
| 2016/0158565 A1 | 6/2016 | Lee |
| 2016/0287126 A1 | 10/2016 | Parker et al. |
| 2016/0339251 A1 | 11/2016 | Kent et al. |
| 2016/0361542 A1 | 12/2016 | Kaula et al. |
| 2017/0120056 A1 | 5/2017 | Woods et al. |
| 2017/0128019 A1 | 5/2017 | Shao et al. |
| 2017/0189687 A1 | 7/2017 | Steinke et al. |
| 2017/0189689 A1 | 7/2017 | Steinke et al. |
| 2017/0281959 A1 | 10/2017 | Serrano Carmona et al. |
| 2017/0333701 A1 | 11/2017 | Bradley et al. |
| 2017/0333715 A1 | 11/2017 | De Ridder et al. |
| 2018/0071513 A1 | 3/2018 | Weiss et al. |
| 2018/0071520 A1 | 3/2018 | Weerakoon et al. |
| 2018/0071527 A1 | 3/2018 | Feldman et al. |
| 2018/0110987 A1 | 4/2018 | Parker |
| 2018/0132747 A1 | 5/2018 | Parker et al. |
| 2018/0133459 A1 | 5/2018 | Parker et al. |
| 2018/0140831 A1 | 5/2018 | Feldman et al. |
| 2018/0140843 A1 | 5/2018 | Kent et al. |
| 2018/0221644 A1 | 8/2018 | Grill et al. |
| 2019/0030323 A1 | 1/2019 | Koka et al. |
| 2019/0038902 A1 | 2/2019 | Kaemmerer et al. |
| 2019/0070418 A1 | 3/2019 | Hincapie Ordonez et al. |
| 2019/0076645 A1 | 3/2019 | Bower et al. |
| 2019/0083796 A1 | 3/2019 | Weerakoon et al. |
| 2019/0099602 A1 | 4/2019 | Esteller et al. |
| 2019/0143120 A1 | 5/2019 | Sinclair et al. |
| 2019/0175915 A1 | 6/2019 | Brill et al. |
| 2019/0209844 A1 | 7/2019 | Esteller et al. |
| 2019/0209851 A1 | 7/2019 | Kothandaraman et al. |
| 2019/0232062 A1 | 8/2019 | Falowski |
| 2019/0262609 A1 | 8/2019 | Brill et al. |
| 2019/0274637 A1 | 9/2019 | Wilson et al. |
| 2019/0275331 A1 | 9/2019 | Zhu |
| 2019/0299006 A1 | 10/2019 | Marnfeldt |
| 2019/0329025 A1* | 10/2019 | Moffitt ............... A61N 1/36067 |
| 2019/0366094 A1 | 12/2019 | Esteller et al. |
| 2019/0381318 A1 | 12/2019 | Sinclair et al. |
| 2020/0001086 A1 | 1/2020 | Fernandez et al. |
| 2020/0001091 A1 | 1/2020 | Marnfeldt |
| 2020/0038660 A1 | 2/2020 | Torgerson |
| 2020/0138324 A1 | 5/2020 | Sinclair et al. |
| 2020/0147393 A1 | 5/2020 | Zhang et al. |
| 2020/0305744 A1 | 10/2020 | Weerakoon et al. |
| 2020/0305745 A1 | 10/2020 | Wagenbach et al. |
| 2020/0335221 A1 | 10/2020 | Fichtinger et al. |
| 2020/0391037 A1 | 12/2020 | Grado et al. |
| 2021/0016091 A1 | 1/2021 | Parker et al. |
| 2021/0046322 A1 | 2/2021 | Zhang et al. |
| 2021/0121696 A1 | 4/2021 | Parker et al. |
| 2021/0236821 A1* | 8/2021 | Sinclair ............... A61N 1/36175 |
| 2021/0267523 A1 | 9/2021 | Donoghue et al. |
| 2021/0339014 A1 | 11/2021 | Dinsmoor et al. |
| 2021/0339024 A1* | 11/2021 | Naor .................. A61N 1/0534 |
| 2022/0007987 A1 | 1/2022 | Huang et al. |
| 2022/0040486 A1 | 2/2022 | Moffitt |
| 2022/0054090 A1 | 2/2022 | Brockway et al. |
| 2022/0111213 A1 | 4/2022 | Cassar et al. |
| 2022/0151535 A1 | 5/2022 | Parker et al. |
| 2022/0152339 A1* | 5/2022 | Oliveri ............... G02B 26/0891 |
| 2022/0218995 A1 | 7/2022 | Block et al. |
| 2022/0233866 A1 | 7/2022 | Gururaj et al. |
| 2022/0266022 A1 | 8/2022 | Steinke et al. |
| 2022/0296892 A1 | 9/2022 | Esteller et al. |
| 2022/0296893 A1 | 9/2022 | Steinke et al. |
| 2022/0339448 A1 | 10/2022 | Jayakumar et al. |
| 2023/0023842 A1 | 1/2023 | Steinke et al. |
| 2023/0062062 A1 | 3/2023 | Litvak et al. |

(56) References Cited

U.S. PATENT DOCUMENTS

| | | | |
|---|---|---|---|
| 2023/0069981 A1 | 3/2023 | Isaacson et al. | |
| 2023/0099390 A1 | 3/2023 | Esteller et al. | |
| 2023/0141183 A1 | 5/2023 | Moore et al. | |
| 2023/0191130 A1* | 6/2023 | Bartlett | A61N 1/36139 607/62 |
| 2023/0271015 A1 | 8/2023 | Malekmohammadi et al. | |
| 2025/0032796 A1* | 1/2025 | Shirvalkar | A61N 1/36167 |

FOREIGN PATENT DOCUMENTS

| | | |
|---|---|---|
| CN | 107280665 A | 10/2017 |
| EP | 3229891 A1 | 10/2017 |
| WO | 2016/205231 A1 | 12/2016 |
| WO | 2018/008034 A2 | 1/2018 |
| WO | 2018/163178 A1 | 9/2018 |
| WO | 2018/213872 A1 | 11/2018 |
| WO | 2019/070406 A1 | 4/2019 |
| WO | 2019/210371 A1 | 11/2019 |
| WO | 2019/211314 A1 | 11/2019 |
| WO | 2019/217079 A1 | 11/2019 |
| WO | 2020/223165 A1 | 11/2020 |
| WO | 2021/026151 | 2/2021 |
| WO | 2021/080727 | 4/2021 |

OTHER PUBLICATIONS

Georgopoulos, Apostolos P., et al., "On the Relations Between the Direction of Two-Dimensional Arm Movements and Cell Discharge in Primate Motor Cortex," The Journal of Neuroscience, vol. 2, No. 11, pp. 1527-1537, 1982.

Gmel, Gerrit E., et al., "A New Biomarker for Closed-Loop Deep Brain Stimulation in the Subthalamic Nucleus for Patients with Parkinson's Disease," IEEE Biomedical Circuits and Systems Conference (BioCAS) Proceedings, Lausanne, 2014, pp. 500-503.

Gmel, Gerrit E., et al., "A New Biomarker for Subthalamic Deep Brain Stimulation for Patients with Advanced Parkinson's Disease—A Pilot Study," J. Neural Eng., 12, 2015, 11 pages.

Gmel, Gerrit Eduard, "Evoked Brain Neural Potentials," Dissertation for The University of New South Wales, Sep. 2016, 231 pages.

Hatsopoulos, Nicholas G. et al., "Sensing with the Motor Cortex," J. Neuron, 72(3), 22 pages, 2011.

Kent, A.R., et al., "Recording Evoked Potentials During Deep Brain Stimulaton: Development and Validation of Instrumentation to Suppress to Stimulus Artefact," J Neural Eng., 9(3), Jun. 2012, 30 pages.

Kent, Alexander R., et al., "Neural Origin of Evoked Potentials During Thalamic Deep Brain Stimulation," J Neurophysiol, 110, 2013, pp. 826-843.

Kent, Alexander Rafael, et al., "Characterization of Evoked Potentials During Deep Brain Stimulation in the Thalamus," Dissertation Submitted in the Department of Biomedical Engineering Duke University, 2013, 320 pages.

Kirsch AD, et al., "Anodic Versus Cathodic Neurostimulation of the Subthalamic Nucleus: A Randomized-Controlled Study of Acute Clinical Effects," Parkinsonism and Related Disorders, 55, 2018, pp. 61-67.

Laarne, Paivi, et al., "Accuracy of Two Dipolar Inverse Algorithms Applying Reciprocity for Forward Calculation," Computers and Biomedical Research, vol. 33, Issue 3, pp. 172-185, Jun. 2000.

Moffitt, Michael A., et al., "Electrical Localization of Neural Activity in the Dorsal Horn of the Spinal Cord: A Modeling Study," Annals of Biomedical Engineering, 32(12), pp. 1694-1709, 2004.

Pascual-Marqui, RD, "Standardized Low-Resolution Brain Electromagnetic Tomography (sLORETA): Technical Details," Methods Find Exp Clin Pharmacol, 24 Suppl D, 5-12. 2002.

Shils, Jay, et al., "Motor Evoked Potential Recordings During Segmented DBS—A Feasibility Study," Oper Neurosurg (Hagerstown), Mar. 15, 2021, 20(4), pp. 419-425.

Thevathasan, Wesley, et al., "Tailoring Subthalamic Nucleus Deep Brain Stimulation for Parkinson's Disease Using Evoked Resonant Neural Activity," Frontiers in Human Neuroscience, vol. 14, Article 71, Feb. 2020, 6 pages.

Walker, Harrison, MD, et al., Directional Subthalamic Nucleus DBS for Parkinson's Disease: Year 3 Interim Analyses, UAB Medicine Poster, 2020, 1 page.

Wiest, C., et al., "Local Field Potential Activity Dynamics in Response to Deep Brain Stimulation of the Subthalamic Nucleus in Parkinson's Disease." Neurobiology of Disease, 2019, 41 pages.

Zelmann, Rina, et al., "Automatic Optimization of Depth Electrode Trajectory Planning," Montreal Neurological Institute Neurology and Neurosurgery, CLIP 2013, LNCS 8361, 2014, pp. 99-104.

Beriault, Silvain, et al., "A Multi-Modal Approach to Computer-Assisted Deep Brain Stimulation Trajectory Planning," International Journal of Computer Assisted Radiology and Surgery, 7, 2012, pp. 687-704.

Beriault, Silvain, et al., "A Prospective Evaluation of Computer-Assisted Deep Brain Stimulation Trajectory Planning," Montreal Neurological Institute McConnell Brain Imaging Centre, CLIP 2012, LNCS 7761, 2013, pp. 42-49.

Frankemolle, Anneke M.M., "Reversing Cognitive-Motor Impairments in Parkinson's Disease Patients Using a Computational Modelling Approach to Deep Brain Stimulation Programming," Brain—A Journal of Neurology, 133, 2010, pp. 746-761.

Sinclair, Nicholas C., et al., "Subthalamic Nucleus Deep Brain Stimulation Evokes Resonant Neural Activity," Annals of Neurology, 83(5), pp. 1027-1031, May 4, 2018.

Sinclair, Nicholas C., et al., "Subthalamic Nucleus Deep Brain Stimulation Evokes Resonant Neural Activity," Poster, 2019, 1 page.

Sinclair, Nicholas C., et al., "Deep Brain Stimulation for Parkinson's Disease Modulates High-Frequency Evoked and Spontaneous Neural Activity," Neurobiology of Disease, vol. 130, 104522, Oct. 2019.

Sinclair, Nicholas C., et al., "On the Neural Basis of Deep Brain Stimulation Evoked Resonant Activity," Biomed. Phys. Eng. Express, 5, 2019, 9 pages.

Sinclair, Nicholas C., et al., "Directional Deep Brain Stimulation Evoked Resonant Neural Activity (ERNA)," Poster, 2020, 1 page.

Wiest, C. et al., "Local Field Potential Activity Dynamics in Response to Deep Brain Stimulation of the Subthalamic Nucleus in Parkinson's Disease," Neurobiology of Disease, 143, 2020, 15 pages.

Wiest, C., et al., "Subthalamic Deep Brain Stimulation Induces Finely-Tuned Gamma Oscillations in the Absence of Levodopa," Neurobiology of Disease, 152, 105287, 2021, 13 pages.

Qian, Xing, et al., "A Method for Removal of Deep Brain Stimulation Artifact From Local Field Potentials," IEEE Transactions on Neural Systems and Rehabilitation Engineering, vol. 25, No. 12, Dec. 2017, 10 pages.

\* cited by examiner

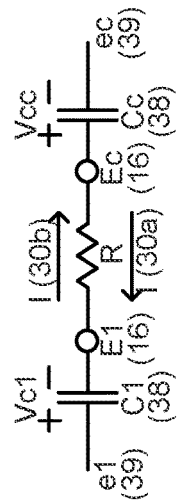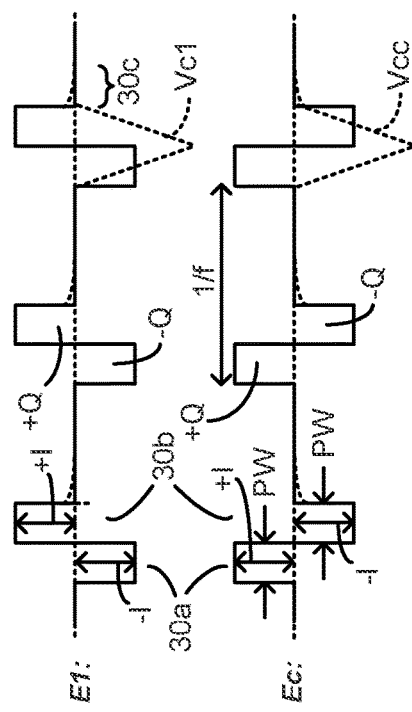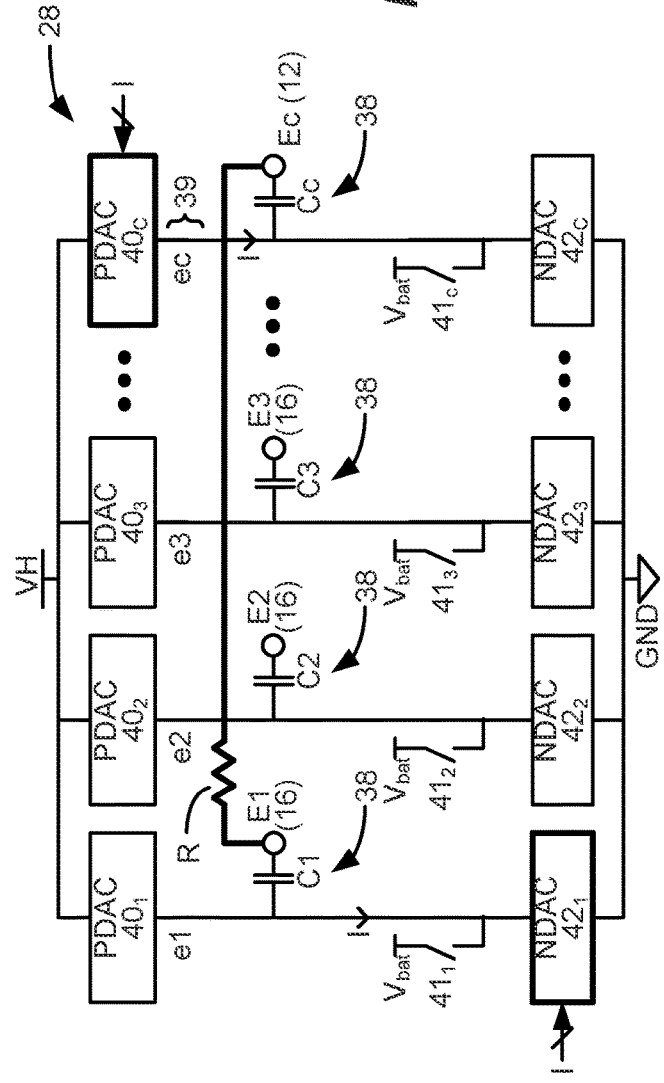
Figure 2A
Figure 2B
Figure 3

ADAPTIVE DEEP BRAIN STIMULATION BASED ON NEURAL SIGNALS WITH DYNAMICS

CROSS REFERENCE TO RELATED APPLICATIONS

This is a non-provisional of U.S. Provisional Patent Application Ser. No. 63/266,081, filed Dec. 28, 2021, to which priority is claimed, and which is incorporated herein by reference.

FIELD OF THE INVENTION

This application relates to deep brain stimulation (DBS), and more particularly, to methods and systems for using sensed neural responses for facilitating aspects of DBS.

INTRODUCTION

Implantable neurostimulator devices are devices that generate and deliver electrical stimuli to body nerves and tissues for the therapy of various biological disorders, such as pacemakers to treat cardiac arrhythmia, defibrillators to treat cardiac fibrillation, cochlear stimulators to treat deafness, retinal stimulators to treat blindness, muscle stimulators to produce coordinated limb movement, spinal cord stimulators to treat chronic pain, cortical and deep brain stimulators to treat motor and psychological disorders, and other neural stimulators to treat urinary incontinence, sleep apnea, shoulder subluxation, etc. The description that follows will generally focus on the use of the invention within Deep Brain Stimulation (DBS). DBS has been applied therapeutically for the treatment of neurological disorders, including Parkinson's Disease, essential tremor, dystonia, and epilepsy, to name but a few. Further details discussing the treatment of diseases using DBS are disclosed in U.S. Pat. Nos. 6,845,267, 6,845,267, and 6,950,707. However, the present invention may find applicability with any implantable neurostimulator device system.

Each of these neurostimulation systems, whether implantable or external, typically includes one or more electrode carrying stimulation leads, which are implanted at the desired stimulation site, and a neurostimulator, used externally or implanted remotely from the stimulation site, but coupled either directly to the neurostimulation lead(s) or indirectly to the neurostimulation lead(s) via a lead extension. The neurostimulation system may further comprise a handheld external control device to remotely instruct the neurostimulator to generate electrical stimulation pulses in accordance with selected stimulation parameters. Typically, the stimulation parameters programmed into the neurostimulator can be adjusted by manipulating controls on the external control device to modify the electrical stimulation provided by the neurostimulator system to the patient.

Thus, in accordance with the stimulation parameters programmed by the external control device, electrical pulses can be delivered from the neurostimulator to the stimulation electrode(s) to stimulate or activate a volume of tissue in accordance with a set of stimulation parameters and provide the desired efficacious therapy to the patient. The best stimulus parameter set will typically be one that delivers stimulation energy with the right timing and pattern to the volume of tissue or neural pathways that must be stimulated in order to provide the therapeutic benefit (e.g., treatment of movement disorders), while minimizing the volume of non-target tissue or neural pathways that are stimulated. A typical stimulation parameter set may include the electrodes that are acting as anodes or cathodes, as well as the amplitude, duration, and rate or generally pattern of the stimulation pulses.

Non-optimal electrode placement and stimulation parameter selections may result in excessive energy consumption due to stimulation that is set at too high an amplitude, too wide a pulse duration, or too fast a frequency; inadequate or marginalized treatment due to stimulation that is set at too low an amplitude, too narrow a pulse duration, or too slow a frequency; or stimulation of neighboring neural populations or other areas remote to the stimulation site via connecting neural pathways that may result in undesirable side effects. For example, bilateral DBS of the subthalamic nucleus (STN) has been shown to provide effective therapy for improving the major motor signs of advanced Parkinson's disease, and although the bilateral stimulation of the subthalamic nucleus is considered safe, an emerging concern is the potential negative consequences that it may have on cognitive functioning and overall quality of life (see A. M. M. Frankemolle, et al., Reversing Cognitive-Motor Impairments in Parkinson's Disease Patients Using a Computational Modelling Approach to Deep Brain Stimulation Programming, Brain 2010; pp. 1-16). In large part, this phenomenon is due to the small size of the STN. Even with the electrodes are located predominately within the sensorimotor territory, the electrical field generated by DBS is non-discriminately applied to all neural elements surrounding the electrodes, thereby resulting in the spread of current to neural elements affecting cognition. As a result, diminished cognitive function during stimulation of the STN may occur do to non-selective activation of non-motor pathways within or around the STN.

The large number of electrodes available, combined with the ability to generate a variety of complex stimulation pulses, presents a huge selection of stimulation parameter sets to the clinician or patient. In the context of DBS, neurostimulation leads with a complex arrangement of electrodes that not only are distributed axially along the leads, but are also distributed circumferentially around the neurostimulation leads as segmented electrodes, can be used.

To facilitate such selection, the clinician generally programs the external control device, and if applicable the neurostimulator, through a computerized programming system. This programming system can be a self-contained hardware/software system, or can be defined predominantly by software running on a standard personal computer (PC) or mobile platform. The PC or custom hardware may actively control the characteristics of the electrical stimulation generated by the neurostimulator to allow the optimum stimulation parameters to be determined based on patient feedback, including both, but not limited to, behavioral and clinical response, anatomical and neurophysiological information and to subsequently program the external control device with the optimum stimulation parameters.

When electrical leads are implanted within the patient, the computerized programming system may be used to instruct the neurostimulator to apply electrical stimulation to test placement of the leads and/or electrodes, thereby assuring that the leads and/or electrodes are implanted in effective locations within the patient. The system may also instruct the user how to improve the positioning of the leads, or confirm when a lead is well-positioned. Once the leads are correctly positioned, a fitting procedure, which may be referred to as a navigation session, may be performed using the computerized programming system to program the external control device, and if applicable the neurostimulator, with a set of stimulation parameters that best addresses the neurological disorder(s).

An aspect of programming the patient's stimulation parameters involves determining which electrodes to use to make electric fields that are best configured to treat the patient's symptoms and to avoid unwanted side effects. In the context of DBS, the leads are typically implanted into a particular region of the brain, such as the STN, as described below. Stimulation of that region may be effective at modulating the patient's symptoms. However, if intensity or amplitude of the stimulation becomes too great it may also stimulate nearby and/or remote non-target areas of the brain and cause side effects. Ideally, the clinician would like to determine a position within the target area of the patient's brain and determine an electrode configuration that provides a large range of stimulation intensities (i.e., a large therapeutic window) without stimulating non-target areas. Thus, there is a need for methods and systems that assist a clinician in doing so.

SUMMARY

Disclosed herein is a method for providing stimulation therapy to a patient's brain using an implantable pulse generator (IPG) connected to one or more electrode leads implanted in the patient's brain, wherein each electrode lead comprises a plurality of electrodes, the method comprising: using stimulation circuitry of the IPG to cause a first one or more of the plurality of electrodes to provide electrical stimulation to the patient's brain, using sensing circuitry of the IPG to record evoked potentials (EPs) using a second one or more of the plurality of electrodes, and using control circuitry of the IPG to: extract one or more features of the recorded EPs, use the extracted one or more features to estimate a network activation value, and use the network activation value to adjust the stimulation. According to some embodiments, using the network activation value to adjust the stimulation comprises adjusting the stimulation to maintain the network activation value within a predetermined range of values. According to some embodiments, using the extracted one or more features to estimate a network activation value comprises providing a model that relates values for the extracted features to values for the network activation and using the model to estimate the network activation based on the extracted features. According to some embodiments, using the network activation value to adjust the stimulation comprises using a control algorithm to provide an adjustment to the stimulation based on the network activation value. According to some embodiments, the method further comprises: using the model to predict new EP features based on the adjustment to the stimulation, recording new EPs following the adjustment to the stimulation, extracting one or more features of the recorded new EPs, comparing the predicted new EP features with the extracted features of the recorded new EPs, and adjusting the model based on the comparison. According to some embodiments, the model is a linear estimate derived from the extracted features. According to some embodiments, the model is a Kuramoto model. According to some embodiments, the model is configured to estimate a wash in time of the change in the network activation value. According to some embodiments, the wash in time is at least thirty seconds. According to some embodiments, the method further comprises using one or more of the plurality of electrodes to record spontaneous potentials in the patient's brain and using the recorded spontaneous potentials to estimate the network activation.

According to some embodiments, the method further comprises recording one or more side-effect signals indicative of a side effect of the stimulation and using the one or more side-effect signals to adjust the stimulation. According to some embodiments, the one or more signals indicative of a side effect comprise motor evoked potentials (MEPs). According to some embodiments, the one or more signals indicative of a side effect comprise signals indicative of internal capsule (IC) activation. According to some embodiments, the method further comprises recording one or more sensor signals determined using one or more sensors and using the one or more sensor signals to adjust the stimulation. According to some embodiments, the one or more sensors comprise a motion sensor, a heart rate monitor, a breathing monitor, a sleep monitor, or a sleep sensor. According to some embodiments, the stimulation is adjusted to minimize power usage. According to some embodiments, the method further comprises training the model to estimate the network activation value based on the one or more features of the recorded EPs. According to some embodiments, the one or more features comprise one or more of a frequency, delay, magnitude, and amplitude. According to some embodiments, the network activation model is configured within non-volatile memory of the IPG. According to some embodiments, the network activation model is configured within non-volatile memory of a remote controller for the IPG.

Also disclosed herein is a system for providing stimulation therapy to a patient's brain using an implantable pulse generator (IPG) connected to one or more electrode leads implanted in the patient's brain, wherein each electrode lead comprises a plurality of electrodes, wherein the IPG comprises: stimulation circuitry configured to cause a first one or more of the plurality of electrodes to provide electrical stimulation to the patient's brain, sensing circuitry configured to record evoked potentials (EPs) using a second one or more of the plurality of electrodes, and control circuitry configured to: extract one or more features of the recorded EPs, use the extracted one or more features to estimate a network activation value, and use the network activation value to adjust the stimulation. According to some embodiments, using the network activation value to adjust the stimulation comprises adjusting the stimulation to maintain the network activation value within a predetermined range of values. According to some embodiments, using the extracted one or more features to estimate a network activation value comprises providing a model that relates values for the extracted features to values for the network activation and using the model to estimate the network activation based on the extracted features.

According to some embodiments, using the network activation value to adjust the stimulation comprises using a control algorithm to provide an adjustment to the stimulation based on the network activation value. According to some embodiments, the control circuitry is further configured to: use the model to predict new EP features based on the adjustment to the stimulation, record new EPs following the adjustment to the stimulation, extract one or more features of the recorded new EPs, compare the predicted new EP features with the extracted features of the recorded new EPs, and adjust the model based on the comparison. According to some embodiments, the model is a linear estimate derived from the extracted features. According to some embodiments, the model is a Kuramoto model. According to some embodiments, the model is configured to estimate a wash in time of the change in the network activation value. According to some embodiments, the wash in time is at least thirty seconds. According to some embodiments, the system is further configured to use one or more of the plurality of electrodes to record spontaneous potentials in the patient's brain and use the recorded spontaneous potentials to estimate the network activation. According to some embodiments, the system is further configured to record one or more side-effect signals indicative of a side effect of the stimulation and use the one or more side-effect signals to adjust the stimulation. According to some embodiments, the one or more signals indicative of a side effect comprise motor evoked potentials (MEPs). According to some embodiments, the one or more signals indicative of a side effect comprise signals indicative of internal capsule (IC) activation. According to some embodiments, the system is further configured to record one or more sensor signals determined using one or more sensors and use the one or more sensor signals to adjust the stimulation. According to some embodiments, the one or more sensors comprise a motion sensor, a heart rate monitor, a breathing monitor, a sleep monitor, or a sleep sensor. According to some embodiments, the stimulation is adjusted to minimize power usage. According to some embodiments, the system is further configured to train the model to estimate the network activation value based on the one or more features of the recorded EPs. According to some embodiments, the one or more features comprise one or more of a frequency, delay, magnitude, and amplitude.

The invention may also reside in the form of a programed external device (via its control circuitry) for carrying out the above methods, a programmed IPG or ETS (via its control circuitry) for carrying out the above methods, a system including a programmed external device and IPG or ETS for carrying out the above methods, or as a computer readable media for carrying out the above methods stored in an external device or IPG or ETS. The invention may also reside in one or more non-transitory computer-readable media comprising instructions, which when executed by a processor of a machine configure the machine to perform any of the above methods.

BRIEF DESCRIPTION OF THE DRAWINGS

FIGS. 2A and 2B show an example of stimulation pulses (waveforms) producible by the IPG or by an External Trial Stimulator (ETS).

FIG. 3 shows an example of stimulation circuitry useable in the IPG or ETS.

DETAILED DESCRIPTION

Figure 1A:
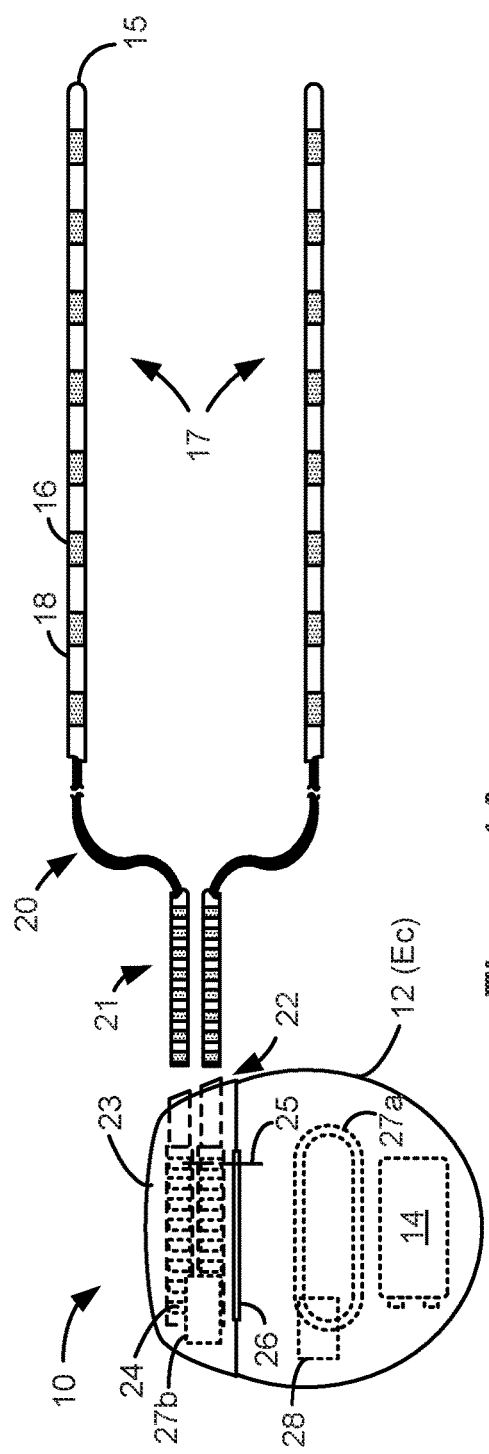
FIG. 1A shows an Implantable Pulse Generator (IPG).

An implantable neurostimulator system, such as a DBS system, typically includes an Implantable Pulse Generator (IPG) 10 shown in FIG. 1A. The IPG 10 includes a biocompatible device case 12 that holds the circuitry and a battery 14 for providing power for the IPG to function. The IPG 10 is coupled to tissue-stimulating electrodes 16 via one or more electrode leads that form an electrode array 17. For example, one or more electrode leads 15 can be used having ring-shaped electrodes 16 carried on a flexible body 18.

Figure 1B:
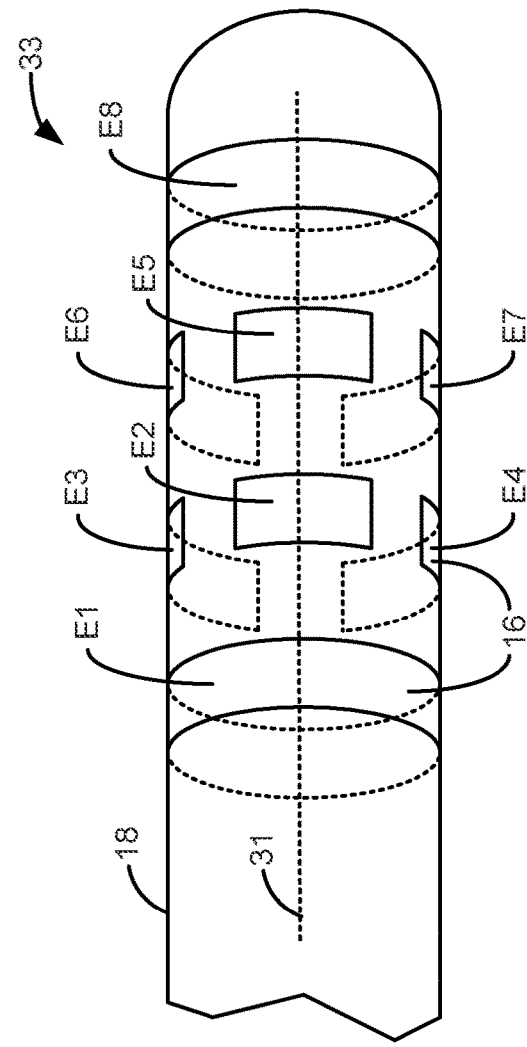
FIG. 1B shows a percutaneous lead having split-ring electrodes.

In yet another example shown in FIG. 1B, an electrode lead 33 can include one or more split-ring electrodes. In this example, eight electrodes 16 (E1-E8) are shown, though the number of electrodes may vary. Electrode E8 at the distal end of the lead and electrode E1 at a proximal end of the lead comprise ring electrodes spanning 360 degrees around a central axis of the lead 33. Electrodes E2, E3, and E4 comprise split-ring electrodes, each of which are located at the same longitudinal position along the central axis 31, but with each spanning less than 360 degrees around the axis. For example, each of electrodes E2, E3, and E4 may span 90 degrees around the axis 31, with each being separated from the others by gaps of 30 degrees. Electrodes E5, E6, and E7 also comprise split-ring electrodes, but are located at a different longitudinal position along the central axis 31 than are split ring electrodes E2, E3, and E4. As shown, the split-ring electrodes E2-E4 and E5-E7 may be located at longitudinal positions along the axis 31 between ring electrodes E1 and E8. However, this is just one example of a lead 33 having split-ring electrodes. In other designs, all electrodes can be split-ring, or there could be different numbers of split-ring electrodes at each longitudinal position (i.e., more or less than three), or the ring and split-ring electrodes could occur at different or random longitudinal positions, etc.

Lead wires 20 within the leads are coupled to the electrodes 16 and to proximal contacts 21 insertable into lead connectors 22 fixed in a header 23 on the IPG 10, which header can comprise an epoxy for example. Once inserted, the proximal contacts 21 connect to header contacts 24 within the lead connectors 22, which are in turn coupled by feedthrough pins 25 through a case feedthrough 26 to stimulation circuitry 28 within the case 12, which stimulation circuitry 28 is described below.

In the IPG 10 illustrated in FIG. 1A, there are sixteen electrodes (E1-E16), split between two percutaneous leads 15 (or contained on a single paddle lead, not shown) and thus the header 23 may include a 2×2 array of eight-electrode lead connectors 22. However, the type and number of leads, and the number of electrodes, in an IPG is application specific and therefore can vary. The conductive case 12 can also comprise an electrode (Ec).

In a DBS application, as is useful in the treatment of movement symptoms in Parkinson's disease for example, the IPG 10 is typically implanted under the patient's clavicle (collarbone). Lead wires 20 are tunneled through the neck and the scalp and the electrode leads 15 (or 33) are implanted through holes drilled in the skull and positioned for example in the subthalamic nucleus (STN) and the Globus pallidus internus (GPi) in each brain hemisphere.

IPG 10 can include an antenna 27a allowing it to communicate bi-directionally with a number of external devices discussed subsequently. Antenna 27a as shown comprises a conductive coil within the case 12, although the coil antenna 27a can also appear in the header 23. When antenna 27a is configured as a coil, communication with external devices preferably occurs using near-field magnetic induction. IPG 10 may also include a Radio-Frequency (RF) antenna 27b. In FIG. 1A, RF antenna 27b is shown within the header 23, but it may also be within the case 12. RF antenna 27b may comprise a patch, slot, or wire, and may operate as a monopole or dipole. RF antenna 27b preferably communicates using far-field electromagnetic waves, and may operate in accordance with any number of known RF communication standards, such as Bluetooth, Bluetooth Low Energy (BLE), as described in U.S. Patent Publication 2019/0209851, Zigbee, WiFi, MICS, and the like.

Stimulation in IPG 10 is typically provided by electrical pulses each of which may include a number of phases such as 30a and 30b, as shown in the example of FIG. 2A. In the example shown, such stimulation is monopolar, meaning that a current is provided between at least one selected lead-based electrode (e.g., E1) and the case electrode Ec 12. Stimulation parameters typically include amplitude (current I, although a voltage amplitude V can also be used); frequency (f); pulse width (PW) of the pulses or of its individual phases such as 30a and 30b; the electrodes 16 selected to provide the stimulation; and the polarity of such selected electrodes, i.e., whether they act as anodes that source current to the tissue or cathodes that sink current from the tissue. These and possibly other stimulation parameters taken together comprise a stimulation program that the stimulation circuitry 28 in the IPG 10 can execute to provide therapeutic stimulation to a patient.

In the example of FIG. 2A, electrode E1 has been selected as a cathode (during its first phase 30a), and thus provides pulses which sink a negative current of amplitude –I from the tissue. The case electrode Ec has been selected as an anode (again during first phase 30a), and thus provides pulses which source a corresponding positive current of amplitude +I to the tissue. Note that at any time the current sunk from the tissue (e.g., –I at E1 during phase 30a) equals the current sourced to the tissue (e.g., +I at Ec during phase 30a) to ensure that the net current injected into the tissue is zero. The polarity of the currents at these electrodes can be changed: Ec can be selected as a cathode, and E1 can be selected as an anode, etc.

IPG 10 as mentioned includes stimulation circuitry 28 to form prescribed stimulation at a patient's tissue. FIG. 3 shows an example of stimulation circuitry 28, which includes one or more current sources $40_i$ and one or more current sinks $42_i$. The sources and sinks $40_i$ and $42_i$ can comprise Digital-to-Analog converters (DACs), and may be referred to as PDACs $40_i$ and NDACs $42_i$ in accordance with the Positive (sourced, anodic) and Negative (sunk, cathodic) currents they respectively issue. In the example shown, a NDAC/PDAC $40_i/42_i$ pair is dedicated (hardwired) to a particular electrode node Ei 39. Each electrode node Ei 39 is connected to an electrode Ei 16 via a DC-blocking capacitor Ci 38, for the reasons explained below. PDACs $40_i$ and NDACs $42_i$ can also comprise voltage sources.

Proper control of the PDACs $40_i$ and NDACs $42_i$ allows any of the electrodes 16 and the case electrode Ec 12 to act as anodes or cathodes to create a current through a patient's tissue, R, hopefully with good therapeutic effect. In the example shown, and consistent with the first pulse phase 30a of FIG. 2A, electrode E1 has been selected as a cathode electrode to sink current from the tissue R and case electrode Ec has been selected as an anode electrode to source current to the tissue R. Thus, PDAC $40_C$ and NDAC $42_1$ are activated and digitally programmed to produce the desired current, I, with the correct timing (e.g., in accordance with the prescribed frequency F and pulse width PW). Power for the stimulation circuitry 28 is provided by a compliance voltage VH, as described in further detail in U.S. Patent Application Publication 2013/0289665.

Other stimulation circuitries 28 can also be used in the IPG 10. In an example not shown, a switching matrix can intervene between the one or more PDACs $40_i$ and the electrode nodes ei 39, and between the one or more NDACs $42_i$ and the electrode nodes. Switching matrices allows one or more of the PDACs or one or more of the NDACs to be connected to one or more electrode nodes at a given time. Various examples of stimulation circuitries can be found in U.S. Pat. Nos. 6,181,969, 8,606,362, 8,620,436, U.S. Patent Application Publications 2018/0071520 and 2019/0083796. The stimulation circuitries described herein provide multiple independent current control (MICC) (or multiple independent voltage control) to guide the estimate of current fractionalization among multiple electrodes and estimate a total amplitude that provides a desired strength. In other words, the total anodic current can be split among two or more electrodes and/or the total cathodic current can be split among two or more electrodes, allowing the stimulation location and resulting field shapes to be adjusted. For example, a "virtual electrode" may be created at a position between two physical electrodes by fractionating current between the two electrodes. In other words, the virtual electrode is not co-located with any of the physical electrodes. Appreciate, that in the context of split ring electrodes, such as electrodes E2-E4 (FIG. 1B), current fractionating can be used to create a virtual electrode at a rotational angle that is between two physical split ring electrodes (e.g., between E2 and E3). Accordingly, current fractionalization can be used to provide stimulation at any location along the lead and at any rotational angle about the lead. Note also that split ring electrodes at a given longitudinal position on the lead can be "ganged" together to effectively create a ring electrode at that position.

Much of the stimulation circuitry 28 of FIG. 3, including the PDACs $40_i$ and NDACs $42_i$, the switch matrices (if present), and the electrode nodes ei 39 can be integrated on one or more Application Specific Integrated Circuits (ASICs), as described in U.S. Patent Application Publications 2012/0095529, 2012/0092031, and 2012/0095519. As explained in these references, ASIC(s) may also contain other circuitry useful in the IPG 10, such as telemetry circuitry (for interfacing off chip with telemetry antennas 27a and/or 27b), circuitry for generating the compliance voltage VH, various measurement circuits, etc.

Also shown in FIG. 3 are DC-blocking capacitors Ci 38 placed in series in the electrode current paths between each of the electrode nodes ei 39 and the electrodes Ei 16 (including the case electrode Ec 12). The DC-blocking capacitors 38 act as a safety measure to prevent DC current injection into the patient, as could occur for example if there is a circuit fault in the stimulation circuitry 28. The DC-blocking capacitors 38 are typically provided off-chip (off of the ASIC(s)), and instead may be provided in or on a circuit board in the IPG 10 used to integrate its various components, as explained in U.S. Patent Application Publication 2015/0157861.

Referring again to FIG. 2A, the stimulation pulses as shown are biphasic, with each pulse comprising a first phase 30a followed thereafter by a second phase 30b of opposite polarity. Biphasic pulses are useful to actively recover any charge that might be stored on capacitive elements in the electrode current paths, such as on the DC-blocking capacitors 38. Charge recovery is shown with reference to both FIGS. 2A and 2B. During the first pulse phase 30a, charge will build up across the DC-blockings capacitors C1 and Cc associated with the electrodes E1 and Ec used to produce the current, giving rise to voltages Vc1 and Vcc which decrease in accordance with the amplitude of the current and the capacitance of the capacitors 38 (dV/dt=I/C). During the second pulse phase 30b, when the polarity of the current I is reversed at the selected electrodes E1 and Ec, the stored charge on capacitors C1 and Cc is actively recovered, and thus voltages Vc1 and Vcc increase and return to 0V at the end the second pulse phase 30b.

To recover all charge by the end of the second pulse phase 30b of each pulse (Vc1=Vcc=0V), the first and second phases 30a and 30b are charged balanced at each electrode, with the first pulse phase 30a providing a charge of −Q (−I*PW) and the second pulse phase 30b providing a charge of +Q (+I*PW) at electrode E1, and with the first pulse phase 30a providing a charge of +Q and the second pulse phase 30b providing a charge of −Q at the case electrode Ec. In the example shown, such charge balancing is achieved by using the same pulse width (PW) and the same amplitude (|I|) for each of the opposite-polarity pulse phases 30a and 30b. However, the pulse phases 30a and 30b may also be charged balance at each electrode if the product of the amplitude and pulse widths of the two phases 30a and 30b are equal, or if the area under each of the phases is equal, as is known.

FIG. 3 shows that stimulation circuitry 28 can include passive recovery switches $41_i$, which are described further in U.S. Patent Application Publications 2018/0071527 and 2018/0140831. Passive recovery switches 41, may be attached to each of the electrode nodes ei 39, and are used to passively recover any charge remaining on the DC-blocking capacitors Ci 38 after issuance of the second pulse phase 30b—i.e., to recover charge without actively driving a current using the DAC circuitry. Passive charge recovery can be prudent, because non-idealities in the stimulation circuitry 28 may lead to pulse phases 30a and 30b that are not perfectly charge balanced.

Therefore, and as shown in FIG. 2A, passive charge recovery typically occurs after the issuance of second pulse phases 30b, for example during at least a portion 30c of the quiet periods between the pulses, by closing passive recovery switches $41_i$. As shown in FIG. 3, the other end of the switches $41_i$ not coupled to the electrode nodes ei 39 are connected to a common reference voltage, which in this example comprises the voltage of the battery 14, Vbat, although another reference voltage could be used. As explained in the above-cited references, passive charge recovery tends to equilibrate the charge on the DC-blocking capacitors 38 by placing the capacitors in parallel between the reference voltage (Vbat) and the patient's tissue. Note that passive charge recovery is illustrated as small exponentially decaying curves during 30c in FIG. 2A, which may be positive or negative depending on whether pulse phase 30a or 30b have a predominance of charge at a given electrode.

Passive charge recovery 30c may alleviate the need to use biphasic pulses for charge recovery, especially in the DBS context when the amplitudes of currents may be lower, and therefore charge recovery less of a concern. For example, and although not shown in FIG. 2A, the pulses provided to the tissue may be monophasic, comprising only a first pulse phase 30a. This may be followed thereafter by passive charge recovery 30c to eliminate any charge build up that occurred during the singular pulses 30a.

Figure 4:
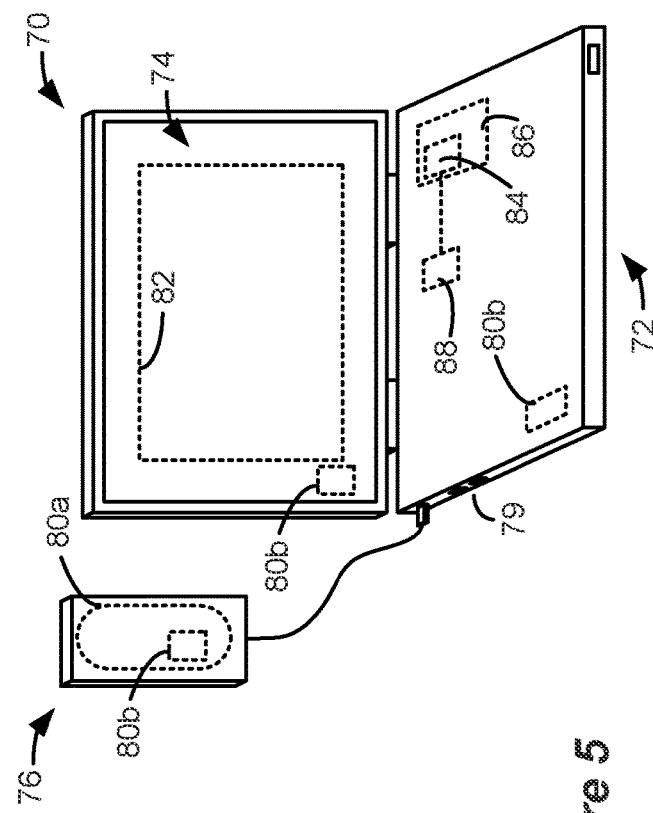
FIG. 4 shows an ETS environment useable to provide stimulation before implantation of an IPG.

FIG. 4 shows an external trial stimulation (ETS) that may be used prior to implantation of an IPG 10 in a patient, for example, in the operating room to test stimulation and confirm the lead position. During external trial stimulation, stimulation can be tried on the implant patient to evaluate therapeutic and side-effect thresholds and confirm that the lead is not too close to structures that cause side effects. Note that the term ETS, as used herein, refers broadly to any non-implanted device used to control the implanted leads to deliver stimulation, whether during the surgical implantation of the leads, during a fitting/programming session, etc. Like the IPG 10, the ETS 50 can include one or more antennas to enable bi-directional communications with external devices such as those shown in FIG. 5. Such antennas can include a near-field magnetic-induction coil antenna 56a, and/or a far-field RF antenna 56b, as described earlier. ETS 50 may also include stimulation circuitry able to form stimulation in accordance with a stimulation program, which circuitry may be similar to or comprise the same stimulation circuitry 28 (FIG. 3) present in the IPG 10. ETS 50 may also include a battery (not shown) for operational power. The sensing capabilities described herein with regard to the IPG 10, may also be included in the ETS 50 for the purposes described below. As the IPG may include a case electrode, an ETS may provide one or more connections to establish similar returns; for example, using patch electrodes. Likewise, the ETS may communicate with the clinician programmer (CP) 70 so that the CP can process the data as described below.

Figure 5:
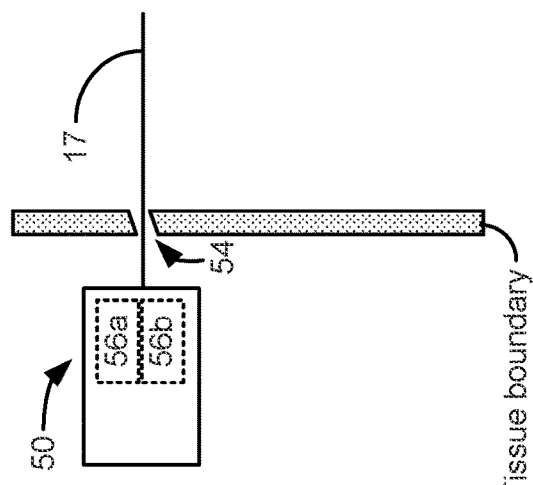
FIG. 5 shows various external devices capable of communicating with and programming stimulation in an IPG or ETS.
Figure 5:
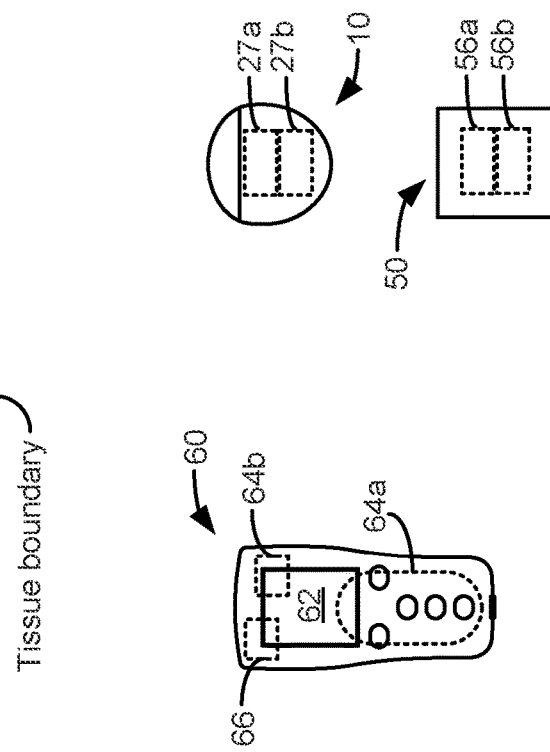

FIG. 5 shows various external devices that can wirelessly communicate data with the IPG 10 or ETS 50, including a patient hand-held external controller 60, and a clinician programmer (CP) 70. Both of devices 60 and 70 can be used to wirelessly transmit a stimulation program to the IPG 10 or ETS 50—that is, to program their stimulation circuitries to produce stimulation with a desired amplitude and timing described earlier. Both devices 60 and 70 may also be used to adjust one or more stimulation parameters of a stimulation program that the IPG 10 is currently executing. Devices 60 and 70 may also wirelessly receive information from the IPG 10 or ETS 50, such as various status information, etc.

External controller 60 can be as described in U.S. Patent Application Publication 2015/0080982 for example and may comprise a controller dedicated to work with the IPG 10 or ETS 50. External controller 60 may also comprise a general-purpose mobile electronics device such as a mobile phone, tablet, or other computing device that has been programmed with a Medical Device Application (MDA) allowing it to work as a wireless controller for the IPG 10 or ETS, as described in U.S. Patent Application Publication 2015/0231402. External controller 60 includes a user interface, preferably including means for entering commands (e.g., buttons or selectable graphical elements) and a display 62. The external controller 60's user interface enables a patient to adjust stimulation parameters, although it may have limited functionality when compared to the more-powerful clinician programmer 70, described shortly.

The external controller 60 can have one or more antennas capable of communicating with the IPG 10. For example, the external controller 60 can have a near-field magnetic-induction coil antenna 64a capable of wirelessly communicating with the coil antenna 27a or 56a in the IPG 10 or ETS 50. The external controller 60 can also have a far-field RF antenna 64b capable of wirelessly communicating with the RF antenna 27b or 56b in the IPG 10 or ETS 50.

Clinician programmer 70 is described further in U.S. Patent Application Publication 2015/0360038, and can comprise a computing device 72, such as a desktop, laptop, or notebook computer, a tablet, a mobile smart phone, a Personal Data Assistant (PDA)-type mobile computing device, etc. In FIG. 5, computing device 72 is shown as a laptop computer that includes typical computer user interface means such as a screen 74, a mouse, a keyboard, speakers, a stylus, a printer, etc., not all of which are shown for convenience. Also shown in FIG. 5 are accessory devices for the clinician programmer 70 that are usually specific to its operation as a stimulation controller, such as a communication "wand" 76 coupleable to suitable ports on the computing device 72, such as USB ports 79 for example.

The antenna used in the clinician programmer 70 to communicate with the IPG 10 or ETS 50 can depend on the type of antennas included in those devices. If the patient's IPG 10 or ETS 50 includes a coil antenna 27a or 56a, wand 76 can likewise include a coil antenna 80a to establish near-field magnetic-induction communications at small distances. In this instance, the wand 76 may be affixed in close proximity to the patient, such as by placing the wand 76 in a belt or holster wearable by the patient and proximate to the patient's IPG 10 or ETS 50. If the IPG 10 or ETS 50 includes an RF antenna 27b or 56b, the wand 76, the computing device 72, or both, can likewise include an RF antenna 80b to establish communication at larger distances. The clinician programmer 70 can also communicate with other devices and networks, such as the Internet, either wirelessly or via a wired link provided at an Ethernet or network port.

To program stimulation programs or parameters for the IPG 10 or ETS 50, the clinician interfaces with a clinician programmer graphical user interface (GUI) 82 provided on the display 74 of the computing device 72. As one skilled in the art understands, the GUI 82 can be rendered by execution of clinician programmer software 84 stored in the computing device 72, which software may be stored in the device's non-volatile memory 86. Execution of the clinician programmer software 84 in the computing device 72 can be facilitated by control circuitry 88 such as one or more microprocessors, microcomputers, FPGAs, DSPs, other digital logic structures, etc., which are capable of executing programs in a computing device, and which may comprise their own memories. For example, control circuitry 88 can comprise an i5 processor manufactured by Intel Corp, as described at https://www.intel.com/content/www/us/en/products/processors/core/ i5-processors.html. Such control circuitry 88, in addition to executing the clinician programmer software 84 and rendering the GUI 82, can also enable communications via antennas 80a or 80b to communicate stimulation parameters chosen through the GUI 82 to the patient's IPG 10.

The user interface of the external controller 60 may provide similar functionality because the external controller 60 can include similar hardware and software programming as the clinician programmer. For example, the external controller 60 includes control circuitry 66 similar to the control circuitry 88 in the clinician programmer 70 and may similarly be programmed with external controller software stored in device memory.

Figure 6:
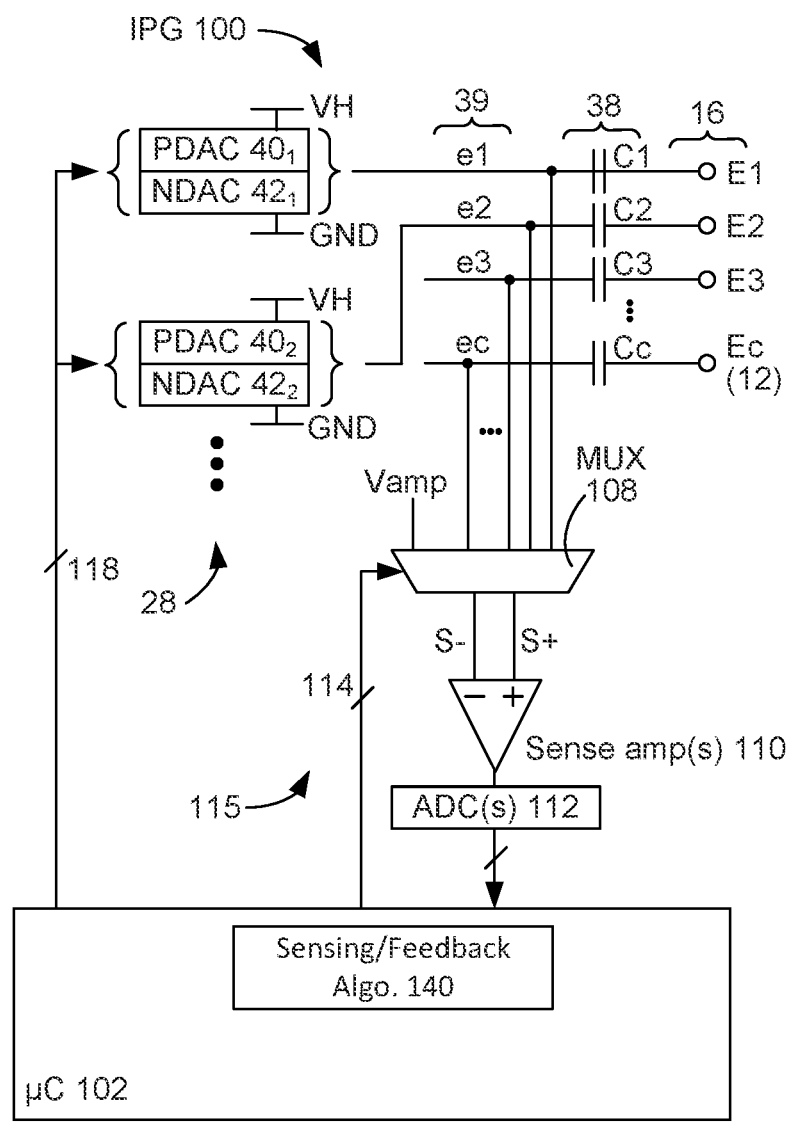
FIG. 6 illustrates sensing circuitry useable in an IPG.

An increasingly interesting development in pulse generator systems is the addition of sensing capability to complement the stimulation that such systems provide. FIG. 6 shows an IPG 100 that includes stimulation and sensing functionality. (An ETS as described earlier could also include stimulation and sensing capabilities). FIG. 6 shows further details of the circuitry in an IPG 100 that can provide stimulation and sensing spontaneous or evoked signals. The IPG 100 includes control circuitry 102, which may comprise a microcontroller, such as Part Number MSP430, manufactured by Texas Instruments, Inc., which is described in data sheets at http://www.ti.com/microcontrollers/msp430-ultra-low-power-mcus/overview.html, which are incorporated herein by reference. Other types of controller circuitry may be used in lieu of a microcontroller as well, such as microprocessors, FPGAs, DSPs, or combinations of these, etc. Control circuitry 102 may also be formed in whole or in part in one or more Application Specific Integrated Circuits (ASICs), such as those described and incorporated earlier. The control circuitry 102 may be configured with one or more sensing/feedback algorithms 140 that are configured to cause the IPG to make certain adjustments and/or take certain actions based on the sensed neural signals and derivatives thereof.

The IPG 100 also includes stimulation circuitry 28 to produce stimulation at the electrodes 16, which may comprise the stimulation circuitry 28 shown earlier (FIG. 3). A bus 118 provides digital control signals from the control circuitry 102 to one or more PDACs $40_i$ or NDACs $42_i$ to produce currents or voltages of prescribed amplitudes (I) for the stimulation pulses, and with the correct timing (PW, F) at selected electrodes. As noted earlier, the DACs can be powered between a compliance voltage VH and ground. As also noted earlier, but not shown in FIG. 4, switch matrices could intervene between the PDACs and the electrode nodes 39, and between the NDACs and the electrode nodes 39, to route their outputs to one or more of the electrodes, including the conductive case electrode 12 (Ec). Control signals for switch matrices, if present, may also be carried by bus 118. Notice that the current paths to the electrodes 16 include the DC-blocking capacitors 38 described earlier, which provide safety by preventing the inadvertent supply of DC current to an electrode and to a patient's tissue. Passive recovery switches 41, (FIG. 3) could also be present but are not shown in FIG. 6 for simplicity.

IPG 100 also includes sensing circuitry 115, and one or more of the electrodes 16 can be used to sense spontaneous or evoked electrical signals, e.g., biopotentials from the patient's tissue. In this regard, each electrode node 39 or combinations thereof can further be coupled to a sense amp circuit 110. Under control by bus 114, a multiplexer 108 can select one or more electrodes to operate as sensing electrodes (S+, S−) by coupling the electrode(s) to the sense amps circuit 110 at a given time, as explained further below. Although only one multiplexer 108 and sense amp circuit 110 are shown in FIG. 6, there could be more than one. For example, there can be four multiplexer 108/sense amp circuit 110 pairs each operable within one or more of e.g. four timing channels supported by the IPG 100 to provide stimulation. The sensed signals output by the sense amp circuitry, or derivatives thereof, are preferably converted to digital signals by one or more Analog-to-Digital converters (ADC(s)) 112, which may sample the output of the sense amp circuit 110 at 50 kHz for example. The ADC(s) 112 may also reside within the control circuitry 102, particularly if the control circuitry 102 has A/D inputs. Multiplexer 108 can also provide a fixed reference voltage, Vamp, to the sense amp circuit 110, as is useful in a single-ended sensing mode (i.e., to set S− to Vamp).

So as not to bypass the safety provided by the DC-blocking capacitors 38, the inputs to the sense amp circuitry 110 are preferably taken from the electrode nodes 39. However, the DC-blocking capacitors 38 will pass AC signal components (while blocking DC components), and thus AC components within the signals being sensed will still readily be sensed by the sense amp circuitry 110. In other examples, signals may be sensed directly at the electrodes 16 without passage through intervening capacitors 38, or only certain electrodes or channels may contain capacitors, or different capacitors may be used, and may be switched in and out of the network.

According to some embodiments, it may be preferred to sense signals differentially, and in this regard, the sense amp circuitry 110 comprises a differential amplifier receiving the sensed signal S+ (e.g., E3) at its non-inverting input and the sensing reference S− (e.g., E1) at its inverting input. As one skilled in the art understands, the differential amplifier will subtract S− from S+ at its output, and so will cancel out any common mode voltage from both inputs. This can be useful for example when sensing various neural signals, as it may be useful to subtract the relatively large-scale stimulation artifact from the measurement (as much as possible). Examples of sense amp circuitry 110, and manner in which such circuitry can be used, can be found in U.S. Patent Application Publications 2019/0299006, 2020/0305744, 2020/0305745 and 2022/0233866. The IPG (and/or ETS) may also be configured to determine impedances at any of the electrodes. For example, the IPG (and/or ETS) may be configured with sample and hold circuitry, controlled by the control circuitry for measuring impedances.

Figure 7:
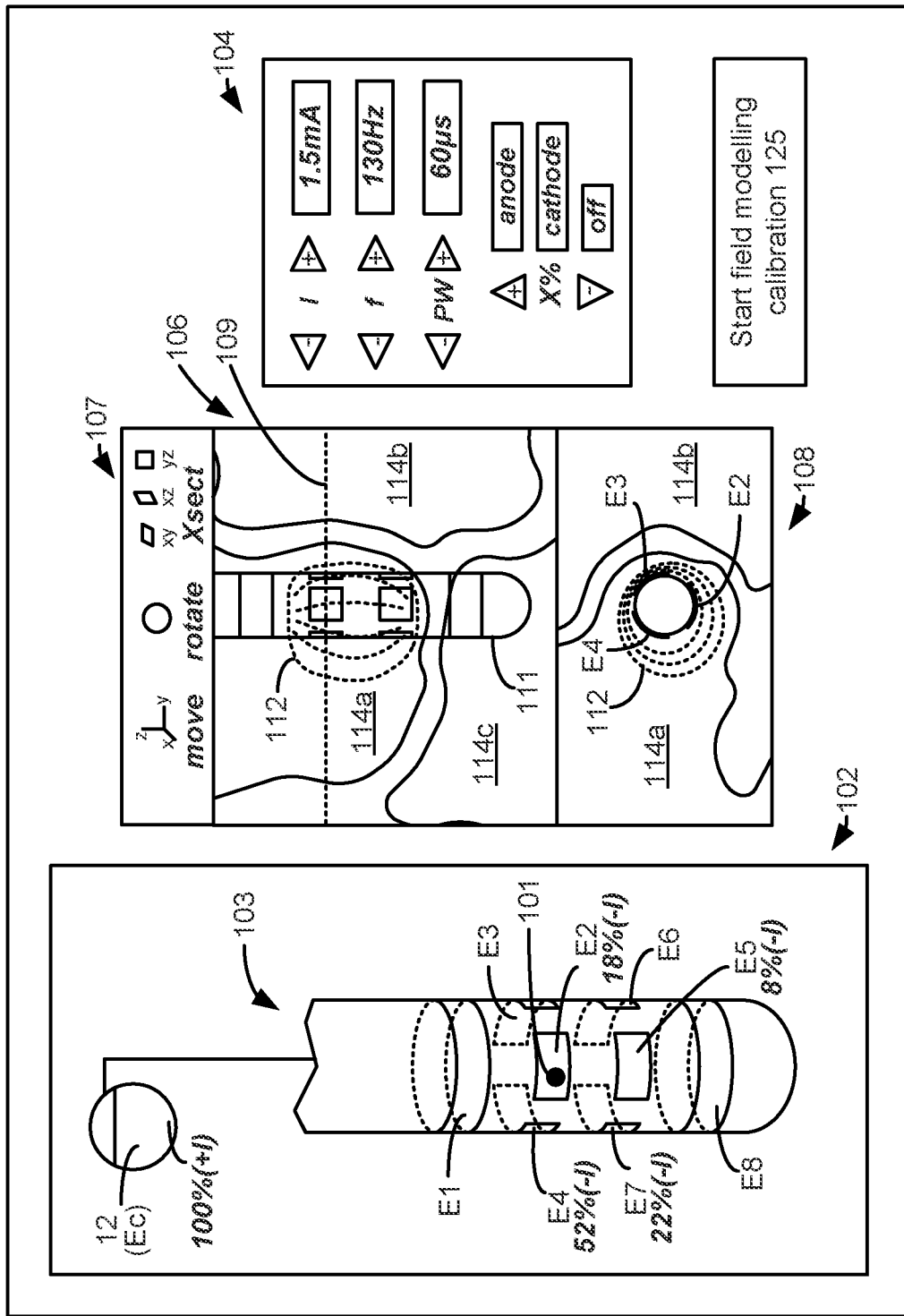
FIG. 7 illustrates an embodiment of a user interface (UI) for programming stimulation.

Particularly in the DBS context, it can be useful to provide a clinician with a visual indication of how stimulation selected for a patient will interact with the tissue in which the electrodes are implanted. This is illustrated in FIG. 7, which shows a Graphical User Interface (GUI) 100 operable on an external device capable of communicating with an IPG 110 or ETS 150. Typically, and as assumed in the description that follows, GUI 100 would be rendered on a clinician programmer 70 (FIG. 5), which may be used during surgical implantation of the leads, or after implantation when a therapeutically useful stimulation program is being chosen for a patient. However, GUI 100 could be rendered on a patient external programmer 60 (FIG. 5) or any other external device capable of communicating with the IPG 110 or ETS 150.

GUI 100 allows a clinician (or patient) to select the stimulation program that the IPG 110 or ETS 150 will provide and provides options that control sensing of spontaneous or evoked responses, as described below. In this regard, the GUI 100 may include a stimulation parameter interface 104 where various aspects of the stimulation program can be selected or adjusted. For example, interface 104 allows a user to select the amplitude (e.g., a current I) for stimulation; the frequency (f) of stimulation pulses; and the pulse width (PW) of the stimulation pulses. Other stimulation parameters could equally be recommended, such as the distribution of anodes and cathodes (sometimes referred to as a fractionalization and polarity, and also described below), stimulation pattern(s), pulse type(s), absolute or relative timing of stimulation, cycling or ramping of parameters (especially the preceding), etc. Stimulation parameter interface 104 can be significantly more complicated, particularly if the IPG 100 or ETS 150 supports the provision of stimulation that is more complicated than a repeating sequence of pulses. See, e.g., U.S. Patent Application Publication 2018/0071513. Nonetheless, interface 104 is simply shown for simplicity in FIG. 7 as allowing only for amplitude, frequency, and pulse width adjustment. Stimulation parameter interface 104 may include inputs to allow a user to select whether stimulation will be provided using biphasic (FIG. 2A) or monophasic pulses, and to select whether passive charge recovery will be used, although again these details aren't shown for simplicity.

Stimulation parameter interface 104 may further allow a user to select the active electrodes—i.e., the electrodes that will receive the prescribed pulses. Selection of the active electrodes and the fractionation of current among the active electrodes can occur in conjunction with a leads interface 102, which can include an image 103 of the one or more leads that have been implanted in the patient. Although not shown, the leads interface 102 can include a selection to access a library of relevant images 103 of the types of leads that may be implanted in different patients.

In the example shown in FIG. 7, the leads interface 102 shows an image 103 of a single split-ring lead 33 like that described earlier with respect to FIG. 1B. The leads interface 102 can include a cursor 101 that the user can move (e.g., using a mouse connected to the clinician programmer 70) to select an illustrated electrode 16 (e.g., E1-E8, or the case electrode Ec). Once an electrode has been selected, the stimulation parameter interface 104 can be used to designate the selected electrode as an anode that will source current to the tissue, or as a cathode that will sink current from the tissue. Further, the stimulation parameter interface 104 allows the amount of the total anodic or cathodic current +I or −I that each selected electrode will receive to be specified in terms of a percentage, X. For example, in FIG. 7, the case electrode 12 Ec is specified to receive X=100% of the current I as an anodic current +I. The corresponding cathodic current −I is split between electrodes E2 (0.18*−I), E4 (0.52*−I), E5 (0.08*−I), and E7 (0.22*−I). Thus, two or more electrodes can be chosen to act as anodes or cathodes at a given time using MICC (as described above), allowing the electric field in the tissue to be shaped. The currents so specified at the selected electrodes can be those provided during a first pulse phase (if biphasic pulses are used), or during an only pulse phase (if monophasic pulses are used).

GUI 100 can further include a visualization interface 106 that can allow a user to view an indication of the effects of stimulation, such as electric field image 112 formed on the one or more leads given the selected stimulation parameters. The electric field image 112 is formed by field modelling in the clinician programmer 70. Only one lead is shown in the visualization interface 106 for simplicity, although again a given patient might be implanted with more than one lead. Visualization interface 106 provides an image 111 of the lead(s) which may be three-dimensional.

The visualization interface 106 preferably, but not necessarily, further includes tissue imaging information 114 taken from the patient, represented as three different tissue structures 114a, 114b and 114c in FIG. 7 for the patient in question, which tissue structures may comprise different areas of the brain for example. Such tissue imaging information may comprise a Magnetic Resonance Image (MRI), a Computed Tomography (CT) image or other type of image and is preferably taken prior to implantation of the lead(s) in the patient. Often, one or more images, such as an MRI, CT, and/or a brain atlas are scaled and combined in a single image model. As one skilled in the art will understand, the location of the lead(s) can be precisely referenced to the tissue structures 114i because the lead(s) are implanted using a stereotactic frame (not shown). This allows the clinician programmer 70 on which GUI 100 is rendered to overlay the lead image 111 and the electric field image 112 with the tissue imaging information in the visualization interface 106 so that the position of the electric field 112 relative to the various tissue structures 114i can be visualized. The image of the patient's tissue may also be taken after implantation of the lead(s), or tissue imaging information may comprise a generic image pulled from a library which is not specific to the patient in question.

The various images shown in the visualization interface 106 (i.e., the lead image 111, the electric field image 112, and the tissue structures 114i) can be three-dimensional in nature, and hence may be rendered in the visualization interface 106 in a manner to allow such three-dimensionality to be better appreciated by the user, such as by shading or coloring the images, etc. Additionally, a view adjustment interface 107 may allow the user to move or rotate the images, using cursor 101 for example.

GUI 100 can further include a cross-section interface 108 to allow the various images to be seen in a two-dimensional cross section. Specifically, cross-section interface 108 shows a particular cross section 109 taken perpendicularly to the lead image 111 and through split-ring electrodes E2, E3, and E4. This cross section 109 can also be shown in the visualization interface 106, and the view adjustment interface 107 can include controls to allow the user to specify the plane of the cross section 109 (e.g., in XY, XZ, or YZ planes) and to move its location in the image. Once the location and orientation of the cross section 109 is defined, the cross-section interface 108 can show additional details. For example, the electric field image 112 can show equipotential lines allowing the user to get a sense of the strength and reach of the electric field at different locations. Although GUI 100 includes stimulation definition (102, 104) and imaging (108, 106) in a single screen of the GUI, these aspects can also be separated as part of the GUI 100 and made accessible through various menu selections, etc.

Figure 8:
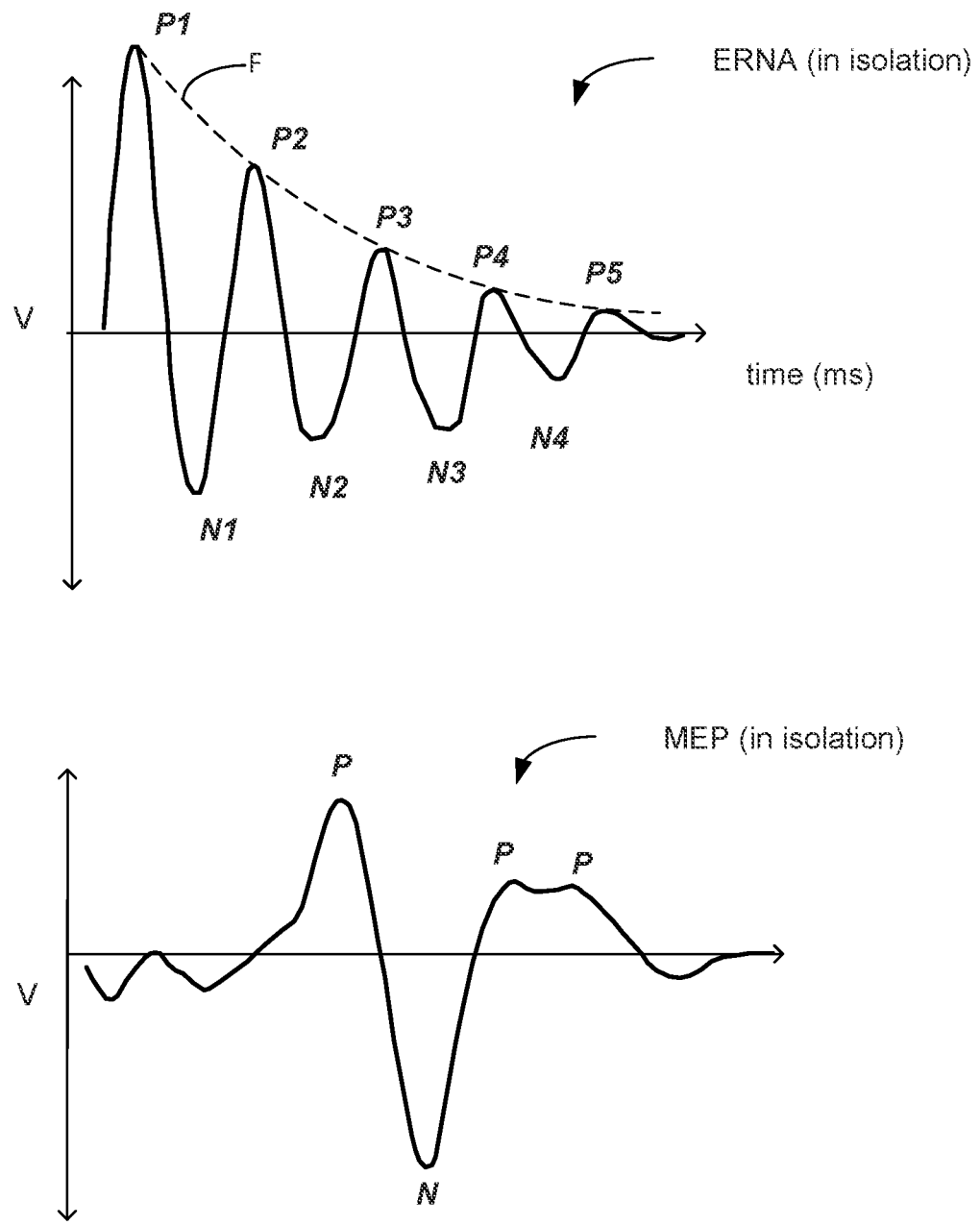
FIG. 8 illustrates examples of evoked potentials (EPs).

It has been observed that DBS stimulation in certain positions in the brain can evoke neural responses, i.e., electrical activity from neural elements, which may be measured either from brain itself or from other locations in the body (such as muscles). Such evoked neural responses are referred to herein generally as evoked potentials (EPs). One example of such EPs are resonant neural responses, referred to herein as evoked resonant neural responses (ERNAs). See, e.g., Sinclair, et al., "Subthalamic Nucleus Deep Brain Stimulation Evokes Resonant Neural Activity," Ann. Neurol. 83(5), 1027-31, 2018. The ERNA responses typically have an oscillation frequency of about 200 to about 500 Hz. Stimulation of the STN, and particularly of the dorsal subregion of the STN, has been observed to evoke strong ERNA responses, whereas stimulation of the posterior subthalamic area (PSA) does not evoke such responses. EPs may be elicited and recorded from additional brain regions, including pallidal and cortical regions, among others. Thus, ERNA may provide a biomarker for electrode location, which can indicate acceptable or optimal lead placement and/or stimulation field placement for achieving the desired therapeutic response. An example of an ERNA in isolation is illustrated in FIG. 8. The ERNA comprises a number of positive peaks $P_n$ and negative peaks $N_n$, which may have one or more characteristic amplitudes, lengths, separations, latencies, or other features. The ERNA signal may decay according to a characteristic decay function F. Such characteristics of the ERNA response may provide indications of the brain activity associated with the neural response.

Another example of an EP is motor evoked potentials (MEPs), which are electrical signals recorded from the descending motor pathways or from muscles following stimulation of motor pathways in the brain. An MEP is shown in isolation in FIG. 8, and comprises a number of peaks that are conventionally labeled with P for positive peaks and N for negative peaks. Note that not all MEPs will have the exact shape and number of peaks as illustrated in FIG. 8. According to some embodiments, EPs, such as MEPs, may be used to limit stimulation. Another example of signals that may be indicative of side effects include signals that may indicate internal capsule (IC) activation. Other examples of electrical activity that may be recorded include spontaneous neural activity (local field potentials) as well as other evoked potentials, such as cortical evoked potentials, compound muscle action potentials (CMAPs), evoked compound action potentials (ECAPs), and the like.

EPs may be used to inform aspects of neuromodulation therapy, such as DBS therapy. For example, U.S. Patent Application Publication 2022/0040486, the entire contents of which are hereby incorporated by reference, describes methods and systems for using EPs, such as ERNA signals, as biomarkers during the surgical implantation of electrode leads within a patient's brain to help place the lead(s) in preferred, optimized, or optimum positions for stimulating targeted neural elements during DBS therapy. That application also describes using EPs during a stimulation fitting procedure to determine preferred, optimized, or an optimum location upon the electrode leads for providing stimulation. Additional stimulation parameters beyond field may be informed by EPs such as ERNA.

In contexts outside of DBS, such as spinal cord stimulation (SCS), recorded EPs have been proposed as biomarkers for closed loop control of stimulation during ongoing, chronic therapy. For example, ECAP features can be used for feedback, such as closed-loop feedback, to adjust the stimulation the IPG 100 provides. See, e.g., U.S. Pat. No. 10,406,368; U.S. Patent Application Publications 2019/0099602, 2019/0209844, 2019/0070418, 2020/0147393; and International Patent Application Publication No. WO 2021/080727. ECAP assessment can also be used to infer the types of neural elements or fibers that are recruited, which can in turn be used to adjust the stimulation to selectively stimulate such elements. See, e.g., U.S. Patent Application Publication 2019/0275331. Assessments of ECAP features can also be used to determine cardiovascular effects, such as a patient's heart rate. See, e.g., U.S. Patent Application Publication 2019/0290900. To the extent one wishes to assess features of an ECAP that are obscured by a stimulation artifact, U.S. Patent Application Publication 2019/0366094 discloses techniques that can used to extract ECAP features from the ESG signal. As discussed in some of these references, detected ECAPs can also be dependent on a patient's posture or activity, and therefor assessment of ECAP features can be used to infer a patient's posture, which may then in turn be used to adjust the stimulation that the IPG 100 provides.

Aspects of this disclosure relate to methods and systems for using EPs, such as ERNA, MEPs and other evoked potentials, as well as other recorded electrical signals, such as local field potentials and/or spontaneous activity, as biomarkers for closed loop feedback control of stimulation during DBS. The methods and systems described herein may be used to regulate DBS stimulation parameters, such as the stimulation amplitude. The stimulation amplitude required to maintain the patient's therapy, or to best balance benefits with side effects, may modulate over time because of the patient's medication state, circadian rhythms, or other factors. These modulations may occur on timescales from milliseconds to days, and are particularly interesting on timescales of minutes and hours. There may be periods of time during which less stimulation amplitude is needed to maintain activation of the particular neural circuits to sustain the patient's therapy. Moreover, according to some embodiments, it may be desirable to reduce the stimulation amplitude to balance the therapeutic efficacy against other parameters, such as the life of the IPG's battery.

Those of skill in the art will appreciate that using EPs, such as ERNA, for closed loop control of DBS presents challenges that are not present with other neuromodulation paradigms, such as SCS. EPs arising during SCS (e.g., ECAPs) are generally dependent on stimulation that is being applied during the moment and not generally impacted by recent past history of stimulation. During SCS a location on the spinal cord is stimulated and EPs can be recorded as they pass some other location (e.g., a location of one or more recording electrodes). By contrast, during DBS stimulation is applied to one or more neural targets that are embedded in a network comprising other neural centers, which themselves may involve further connections. Signals can propagate through the network based on conduction delays and different factors as the signals may change or build up over time. The signals may change as they propagate through the network. Accordingly, EPs arising during DBS (like ERNA) have intrinsic dynamic behavior because of the network properties of the brain structures in which they arise. The shape and/or magnitude of the response signal may evolve over time, for example, as the therapy washes in. Clinical evidence indicates that EPs in the brain do not immediately reach their steady state in response to a change in stimulation. See, e.g., Wiest C, Tinkhauser G, Pogosyan A, He S, Baig F, Morgante F, et al. "Subthalamic deep brain stimulation induces finely-tuned gamma oscillations in the absence of levodopa," Neurobiol. Dis. 2021; 152. According to some embodiments, changes in EPs in response to changes in stimulation parameters may take at least a second to wash in. According to some embodiments, such changes may take at least thirty seconds, and according to some embodiments, at least a minute. These signals may also change as the brain state change due to cognitive or motor function, disease symptoms and behavioral states. Because of the dynamic behavior of such EPs, sampling the EP at any one given moment and determining an EP feature (such as amplitude, e.g.) may not provide the most useful control signal for closed loop control of DBS stimulation. Some EP features may change rapidly and/or significantly with changes in stimulation, while other EP features may change little or not at all. Moreover, the salient features of EPs for providing control may be different from patient to patient.

Embodiments of the disclosed methods and systems involve using recorded EPs to estimate the intrinsic underlying state of brain activity during therapy delivery. That underlying state or states is referred to herein as "network activation." As will be explained in more detail below, the network activation may be determined based on one or more features extracted from one or more signals, especially EPs that are recorded as stimulation is provided to the patient. Models are developed that estimate and predict how the network activation will respond to changes in stimulation parameters, such as stimulation amplitude. Models may also estimate and predict whether updated information is needed. The network activation may be used as biomarkers to determine control signals for closed loop feedback control of DBS stimulation since it reflects the underlying state of the patient's brain activity. According to some embodiments, the models account for the dynamic nature of the underlying brain activity (i.e., the network activation). So, the models can adaptively and predictably adjust the stimulation. According to some embodiments, the modeled network activation is used as a control variable to adjust the stimulation. According to other embodiments (see, e.g., FIG. 13 below), the modeled network activation is combined with other inputs that are not biopotential signals or derivatives, such as information related to therapy performance to determine a control variable.

Figure 9:
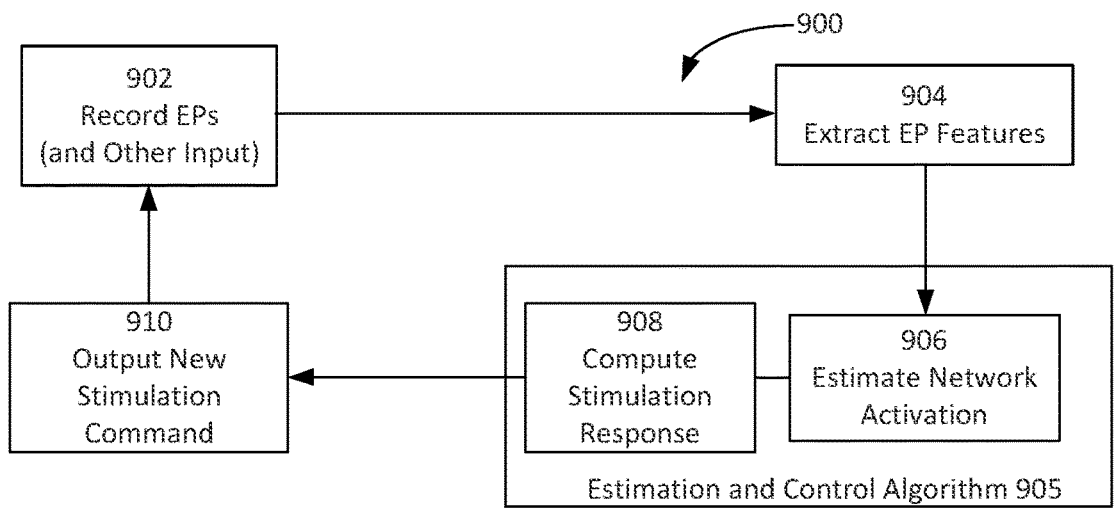
FIG. 9 illustrates an algorithm for adjusting stimulation parameters based on a modeled network activation.

FIG. 9 illustrates an embodiment of an algorithm 900 for closed-loop control of DBS parameters using features extracted from recorded neural responses. The algorithms described herein, such as algorithm 900, may be embodied within the patient's IPG. For example, the microcontroller (102, FIG. 6) may be configured to perform the algorithm(s). Aspects of the disclosed algorithms, such as algorithm 900, may be considered within the ambit of sensing/feedback algorithms 140 (FIG. 6).

For the purposes of this discussion, assume that one or more electrode leads have been implanted within the patient's brain for providing DBS therapy. Typically, at this point, the patient has undergone a fitting procedure, as described above, to determine locations upon the electrode lead for providing stimulation. Now the patient is undergoing chronic DBS therapy, which involves providing stimulation using one or more of the electrodes of the implanted leads. The algorithm 900 works to adjust the patient's DBS stimulation parameters based on the underlying state of their brain activity, as predicted by extracted features of one or more EPs. At step 902, EPs are recorded at one or more of the electrodes. Specifically, one or more of the electrodes are configured for sensing (referred to herein as "recording electrodes") and used to record electrical potentials present at the recording electrodes. According to some embodiments, stimulation may be briefly paused (for a few pulses, for example) while the EPs are recorded. According to other embodiments, stimulation of one type may be interleaved with or supplanted by stimulation of another type, such as switching from passive to active recharge pulses, changing the order delay between two pulse phases, changing the aspect ratio between a primary phase and a charge recovery phase, changing internal circuit layouts (switching components such as capacitors in or out, switching voltage bias channels in or out), changing internal circuit parameters (such as resistances, capacitances, inductances), changing the amplitude, pulse width, rate, field, or pattern of stimulation, other changes to each unit pulse (such as more or fewer phases, including delivering monophasic stimulation for a period of time). According to other embodiments, stimulation is not paused, interleaved, nor supplanted.

Generally, any value or metric may be used as the extracted feature(s). Examples of such features of the evoked potentials include but are not limited to:
- a height of any peak (e.g., N1);
- a peak-to-peak height between any two peaks (such as from N1 to P2);
- a ratio of peak heights (e.g., N1/P2);
- a peak width of any peak (e.g., the full-width half-maximum of N1);
- an area or energy under any peak;
- a total area or energy comprising the area or energy under positive peaks with the area or energy under negative peaks subtracted or added;
- other measures of energy of magnitude of a peak or peaks, such as an RMS measure;
- a length of any portion of the curve of the evoked potential (e.g., the length of the curve from P1 to N2, calculated by various methods, including piecewise sum);
- any time defining the duration of at least a portion of the evoked potential (e.g., the time from P1 to N2);

latencies of any peaks (P1 . . . Pn, N1 . . . Nn, etc.) as well as other feature-to-feature latencies;

amplitude decay function;

a time delay from stimulation to issuance of the evoked potential, which is indicative of the neural conduction speed of the evoked potential, which can be different in different types of neural tissues, such delays optionally calculated from rising edges, falling edges, or at predetermined positions within a pulse width, such positions variable and programmable, and including determination based in whole or part from prior data from same or different patients, or computational models;

a conduction speed (i.e., conduction velocity) of the evoked potential, which can be determined by sensing the evoked potential as it moves past different sensing electrodes;

a measure of variation of any of the previous or other features, e.g., variance or standard deviation;

a rate of variation of any of the previous features, i.e., how such features change over time;

parameters fit to models of rates of changes of features, e.g., envelope, dwell-time, decay constant;

a power (or energy) determined in a specified frequency band (e.g., delta, alpha, beta, gamma, etc.) determined in a specified time window (for example, a time window that overlaps the neural response, the stimulation artifact, etc.);

spectral characteristics in the frequency domain (e.g., Fourier transform);

a cross-correlation or cross-coherence of the evoked potential shape with a target optimal shape;

a nonlinear transform applied to the signal, such as a neural network; and any mathematical combination or function of these features.

The one or more extracted features are provided to an estimation and control algorithm 905. The estimation and control algorithm 905 is configured to use the extracted EP feature(s) to estimate a network activation (step 906), which reflects the underlying state of the neural network in the patient's brain. The estimation and control algorithm can then use that estimated network activation to adjust stimulation (step 908) to maintain therapy and/or to meet one or more other goals (discussed in more detail below).

Figure 10:
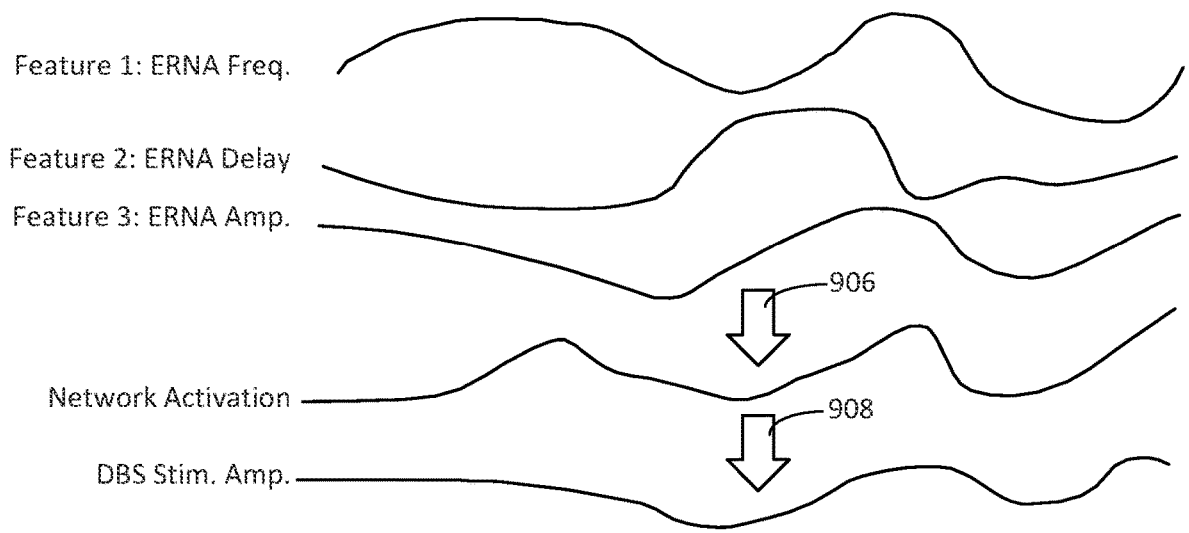
FIG. 10 illustrates combining multiple extracted EP features to estimate an network activation and using network activation to adjust stimulation amplitude.

FIG. 10 schematically illustrates the operation of the estimation and control algorithm 905. FIG. 10 illustrates the behavior of three extracted EP features as a function of time (for example, in the presence of stimulation). The three extracted EP features in this example are the ERNA frequency, the ERNA delay, and the ERNA amplitude. At step 906, the estimation and control algorithm 905 models the network activation from the extracted parameters. At step 908, the estimation and control algorithm 905 adjusts the stimulation amplitude based on the estimated network activation.

The estimation and control algorithm 905 may use one or more models to estimate network activation based on the extracted EP features. According to some embodiments, an empirical model, such as an autoregressive model may be used to model/predict network activation. Examples of such empirical models include autoregressive with exogenous input (ARX) and autoregressive with moving average model with exogenous inputs (ARMAX) models. According to some embodiments, a non-linear estimator model, such as a Kuramoto model may be used. The goal of the modeling is to fit parameters of the model that relate the input of a manipulated stimulation variable to an output of an EP feature/network activation. To achieve this, the network activation model may be subject to training data procedures or system identification techniques.

Figure 11:
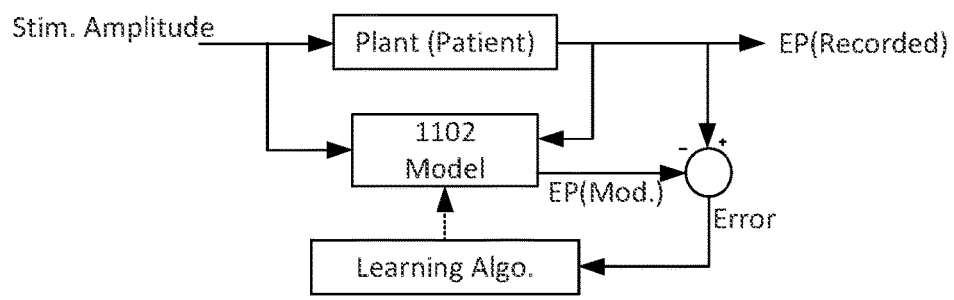
FIG. 11 illustrates using system identification to train an estimation and control algorithm.

FIG. 11 illustrates an embodiment of how system identification techniques can be used to train the estimation and control algorithm to model the network activation based on features of recorded EPs. During a system identification procedure, stimulation is provided to the patient (the plant). The stimulation can be manipulated as a function of time. For example, the stimulation amplitude can be modulated, as described below. The EPs are recorded, and the selected one or more features are extracted from the recorded EPs. The stimulation parameters are also provided to a network activation model 1102, which attempts to model the extracted features. The prediction error between the plant output and the modeled output is used as the training signal, which is provided to the learning algorithm. The network activation model may begin with a base set of parameters and then the learning algorithm seeks to fit/update those parameters so as to relate the manipulated stimulation variable (i.e., the stimulation amplitude) to the output (i.e., the recorded/extracted EP features). Through the training/learning process, the model identifies which of the EP features change with stimulation amplitude (and therefore, with the underlying network activation state). The model also learns the dynamic properties of the changes in the EP features, such as any delay (i.e., wash in/wash out) between when the stimulation changes and when the network activation stabilizes in response to the change. Accordingly, the model can estimate changes in network activation that may take at least a second, at least thirty seconds, or at least a minute to reach steady state. Other clinically relevant information/data can also be used to inform the determination of the network activation state, as described in more detail below. During the ongoing use of control algorithm 905 (as illustrated in FIG. 9), the algorithm continues to predict network activation and how the network activation will change in response to changes in stimulation. Accordingly, the algorithm continues to predict how the extracted features should change. The algorithm can compare those predicted feature changes to the features that are extracted from the actual recorded EPs. If the predicted feature values diverge from the recorded feature values, that may indicate that the model needs to be retrained. The training procedure/system identification process may occur automatically, or be re-prompted to the patient and/or clinical user (for example, via remote, app, or notification) to correct model mismatch. Also, during the ongoing therapy the patient may provide rankings/evaluations of their symptoms/therapy, for example, using their RC or a phone app. Embodiments of the methods may attempt to improve the modeling/predictions based on those rankings and may learn to mistrust, or down-weight rankings that lead to outliers.

Figure 12A:
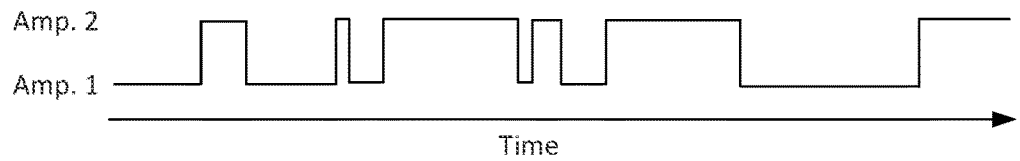
FIGS. 12A and 12B illustrate a training algorithm.
Figure 12B:
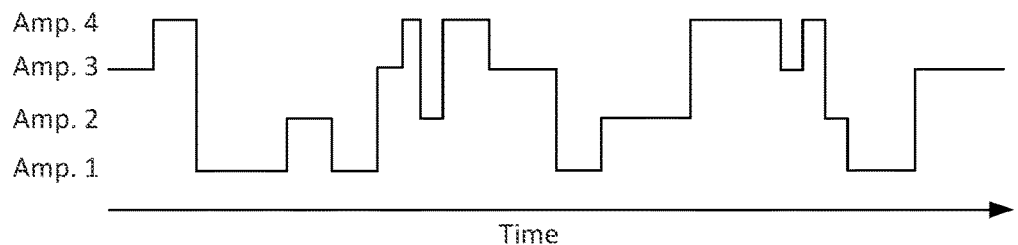

FIGS. 12A and 12B illustrate two examples stimulation amplitude programs that can be used for training/system identification. Assume that a certain stimulation amplitude has been determined for a patient that works well to control the patient's symptoms and that does not produce side effects. That amplitude corresponds to Amp. 2 in the figures and is assumed to correspond to a network activation that is beneficial for the patient. During the training session, the amplitude may be varied in a random or pseudo-random manner (e.g., between Amps. 1 and 2 in FIG. 12A and between Amps. 1-4 in FIG. 12B) while EPs are recorded. The training data is used to model how the EP features/network activation changes in in response to stimulation amplitude to changes. According to some embodiments, the training/system identification process may be conducted using the clinician programmer (CP 70, FIG. 5).

Referring again to FIG. 9, at step 908 the estimation and control algorithm 905 computes a stimulation adjustment based on the estimated network activation. According to some embodiments, the network activation model (1102, FIG. 11) of the estimation and control algorithm 905 can predict how the network activation will change based on a future change of stimulation parameters (such as stimulation amplitude). According to some embodiments, the estimation and control algorithm 905 may adjust stimulation to maintain network activation within a certain predetermined range or above a certain threshold. According to some embodiments, the adjustments to the stimulation may consider objectives in addition to maximizing network activation. For example, the control algorithm may consider factors such as energy savings, avoiding side effects, or the like, and compute a stimulation parameter to achieve a balance between competing objectives of therapy alongside network activation. According to some embodiments, the estimation and control algorithm may be configured to adjust the stimulation to maintain network activation above a predetermined minimum threshold while minimizing energy usage, for example. According to some embodiments, the network activation model may be titrated against the patient's medication schedules so that it can predict changes in the network activation because of expected changes in the patient's medication state. In some embodiments, these schedules are provided by externals, for example when programming; in others, these schedules may be updated when the patient takes medication, and the algorithm can adjust accordingly. That can allow preemptive adjustment of stimulation parameters to compensate for expected changes in the patient's network activation state. Once the estimation and control algorithm 905 has computed a stimulation response (step 908) the adjustment to the stimulation parameters may be outputted to the stimulation circuitry of the patient's IPG (step 910). In other embodiments, other patient affecting schedules may be accounted for in a similar manner, such as sleep.

In the embodiments described above, the network activation is determined based on one or more features of one or more recorded EPs measured using the implanted electrodes. Other clinically relevant signals/data can be used to augment the EP feature(s) for determining/predicting network activation. Such features may include recorded spontaneous signals in the brain such as local field potentials (LFPs) or other evoked signals, like motor evoked potentials (MEP, which may indicate side effects of the stimulation). Such electrical activity can also be recorded using the electrodes present on the implanted DBS electrode leads or using electrodes present on other implanted systems, such as a cortical array. Other examples clinically relevant signals include movement/posture signals, which may be recorded using an accelerometer or other inertial measurement unit (IMU) that may be present within the IPG or that may be an external sensor that the patient wears. Each of these additional clinical indicators can be provided to the estimation and control algorithm 905 and the model can be trained to predict them as a function of stimulation parameters, as described above.

According to some embodiments, the timing of the sensing and feedback strategy for maintaining network activation can be modulated depending on various factors. For example, in situations where the level of stimulation being provided is adequate to maintain the network activation well above a predetermined minimum network activation threshold, it may not be necessary to sense and evaluate network activation as often, compared to a situation where only a minimal amount of stimulation is being provided to maintain a minimally acceptable level of network activation. For example, assume that under typical circumstances for a given patient it has been found that a stimulation at an amplitude of 3 mA is more than adequate to maintain the patient's network activation within a regime that is therapeutic. Under such circumstances, the algorithms may record and analyze EPs every 150 stimulation pulses. Now assume that the stimulation amplitude is dropped to 2 mA, for example, to save battery life. Since the level of network activation is expected to drop under such circumstances, the algorithm may record and analyze EPs more often, for example, every 100 stimulation pulses, to ensure that the network activation is maintained within an effective range. If the stimulation amplitude is dropped further, for example, to 1 mA, the recording rate may be increased further, for example, to every 50 stimulation pulses.

According to some embodiments, the duration of the EPs being recorded may be longer than the stimulation period. According to some embodiments the stimulation may be paused for a short duration (e.g., a few pulses) while the EPs are recorded. According to other embodiments, the entire EP signal may not be recorded, for example, if stimulation is not paused. For example, if attributes of the EPs, such as the first peak, the first few peaks, the latency, etc., of the EPs occur within a window between stimulation pulses, then estimates based on those attributes may be sufficient for the adaptive algorithms described herein, without requiring pausing the stimulation. The algorithms may be configured to use incomplete or partial recording of the EP's for the parameter extraction and network activation estimate. In some embodiments, a method may be trained on longer recording periods of the response. A model fit may be established. In this manner, a shorter recording coupled with a fit longer template may afford interpolation of additional features, which can be used as control signals. In some embodiments, a single acquisition of a shorter period may be inappropriate or insufficient for fitting to afford extrapolation, and so schemes to improve information content (e.g. SNR) may be used, especially averaging. In other embodiments, stimulation is varied across the domain that affects the available duration of recorded signal, such as stimulation frequency, until a balance between therapy and signal is found. This searched rate may then be used to provide chronic therapy. For a particular patient, this may appear as a nominal or starting frequency, for example 130 Hz, and reducing this rate until a preferred balance is found at e.g., 80 Hz, such that a period of 12.5 ms is available instead of 7.7 ms.

In some cases, information from evoked or spontaneous neural signals (especially, a single signal or feature) may be insufficient for use as control signals throughout all regimes. For example, some neural signals and features derived therefrom do not continuously reflect a measure of efficacy across the entire range of stimulation parameters. For example, the ERNA signal may not be present or apparent, or continuously varying or useful, when the amplitude and/or rate are too low or high. In some embodiments the disclosed systems and methods can account for this by classifying user-suggested and/or programmed settings as appropriate or inappropriate (out of bounds, out of range) for closed-loop control. In other cases, it may be that a particular EP (e.g. ERNA) displays varying output until it undergoes a detectable state change only when the patient is achieving good therapy, but no further variation or state change occurs when stimulation is increased above this level. In such a case, additional information, e.g., from an additional EPs or signals, may be used to determine when stimulation is too high, in order to subsequently reduce stimulation. In some embodiments, additional signals are unavailable or undesirable. Accordingly, some embodiments may rely on mutable routines to periodically adjust (especially, reduce) stimulation to re-establish the internal models' state-change region. These routines may be adaptively scheduled as the system learns the user's behavior, driven by pre-set schedules (e.g., implemented internally in memory as lookup tables). For example, by using this method the system may learn the patient's medication schedule and how their therapy should be adjusted to accommodate it, either by collecting input on medication (when doses are administered/taken), or by inspecting changes in signals/features over time. In some embodiments, this learning takes place internally/onboard the stimulator, and in others, involves sending data to externals (RC, app, cloud), performing computation (especially model training), and re-importing models, or model instructions or configurations, back to the devices for online use. In this manner, a closed loop method may start in a passive, learning, or reduced range mode, and gradually increase in the magnitude and rate of change of parameter changes (e.g., amplitude, frequency) as it increases in confidence.

Figure 13:
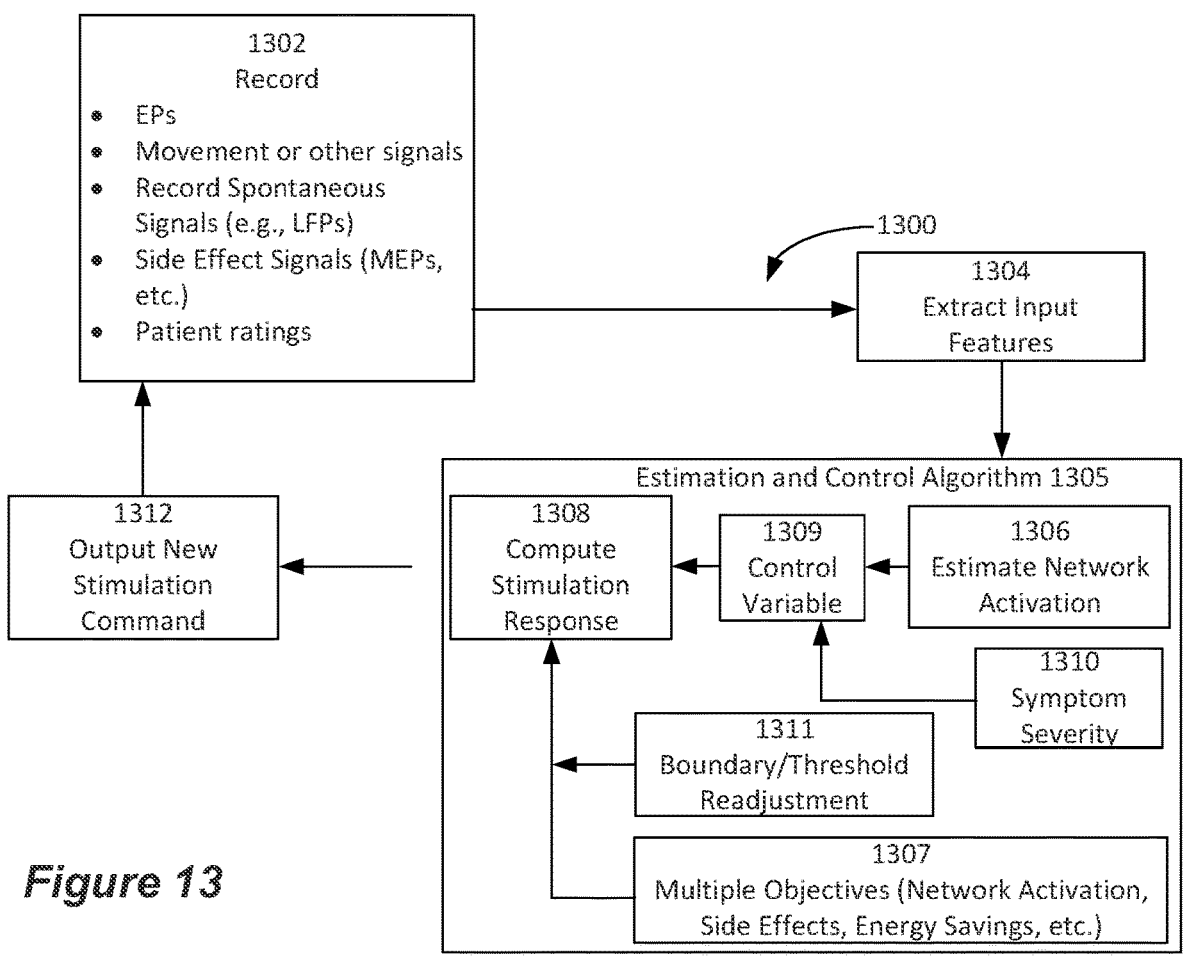
FIG. 13 illustrates an algorithm for adjusting stimulation parameters based on a modeled network activation.

FIG. 13 illustrates another embodiment of an algorithm 1300 for closed-loop control of DBS parameters. Like the algorithm 900 (FIG. 9), the algorithm 1300 uses features extracted from recorded EPs. But the algorithm 1300 is expanded to consider one or more other indicia of therapeutic effectiveness, as described above. For example, at step 1302 EPs may be recorded using one or more sensing electrodes, as described above. Also (or alternatively), one or more other electrical signals may be recoded, such as other evoked potentials (especially those that can be co-recorded with the first signal), spontaneous signals (such as local field potentials (LPFs)), and or motor evoked potentials (MEPs). Other inputs may be recorded, such as signals from the same implanted device, such as accelerometry, impedance, movement sensors, sleep sensors, heart rate and/or blood pressure sensors, speech sensors, and the like. The algorithm may also receive patient symptom/therapy rankings from the patient, for example, provided using the patient's RC or app(let).

At step 1304, one or more features of the various measured/recorded inputs are extracted. Features of recorded EPs may be extracted, as described above. Likewise features of other recorded evoked or spontaneous neural signals, such as magnitudes, amplitudes, delays, frequencies, or the like may be extracted from the recorded signals. The extracted features are provided to the estimation and control algorithm 1305. The estimation and control algorithm 1305 may operate as described above with reference to the algorithm 905 (FIG. 9), except that the algorithm 1305 considers the features extracted from the other indicia described here, in addition to features extracted from EPs. The algorithm 1305 may be trained by varying the stimulation in a training/system identification procedure, as described above with regard to FIGS. 11 and 12, except that with the algorithm 1305, the changes in the additional indicia features are also determined. Accordingly, the model can learn how those additional features change when stimulation changes. The model can learn when its predictive capacity has grown stale, and new primary (e.g., EP) or secondary indicia are needed. The algorithm 1305 can use the extracted input features to estimate a network activation 1306, as described above. That modeled network activation may be combined with other information to compute a control variable 1309. For example, the control variable may also be calculated based on information about the severity of the patient's symptoms 1310, which may be determined based on the patient ratings, measurements from sensors, such as motion sensors, heart rate monitors, breathing monitors, sleep monitors, and the like. The algorithm 1305 uses the control variable compute an appropriate stimulation adjustment 1308, as described above. The adjustment may be configured to maintain the network activation within a certain range, for example, above a predetermined floor value and below a predetermined ceiling value. In other embodiments, the floor and ceiling values may be modulated, from externals or internally by the model, including especially based on primary and secondary indicia. In some embodiments, the model may periodically make special queries to the patient to inform operating bounds, including by pausing or adjusting stimulation, or applying concurrent stimulation of a particular type, in order to obtain updated values, especially for evoked potentials. Embodiments of the algorithm may consider multiple objectives 1307 in addition to simply maintaining a certain level of network activation. For example, the algorithm may be configured to also consider minimizing side effects (for example, as determined based on analysis of a second evoked potential, MEP, patient ranking, or other signals indicative of side effects). The algorithm may also periodically adjust or reestablish the threshold values used to calculate a stimulation response based on the control variable (step 1311). For example, the algorithm may be configured to consider time since the last check, and/or to learn information about the patient's typical stimulation usage and to readjust the response in occurrence to an unusual day. At step 1312 the algorithm can output an appropriate stimulation adjustment/command to the IPG.

The algorithm periodically inspects EPs, such as ERNA, using an evoking paradigm. If the system determines stimulation is insufficient, it proceeds to a routine to increase stimulation until it is sufficient. If the system determines that the EP response is in a 'sufficient' domain, it consults additional information, including internal models, to determine whether to re-establish a sufficient boundary. Such internal models may consider time since last check, and the thresholds to wait or initiate a new search can be set and adjusted from externals (programmed by physician on CP, adjusted by user on RC/app) and made patient-specific by IPG routines, such as those which learn the patients usual daily and weekly and responses, and can adjust these in the occurrence of an unusual day or event.

Although particular embodiments of the present invention have been shown and described, it should be understood that the above discussion is not intended to limit the present invention to these embodiments. It will be obvious to those skilled in the art that various changes and modifications may be made without departing from the spirit and scope of the present invention. Thus, the present invention is intended to cover alternatives, modifications, and equivalents that may fall within the spirit and scope of the present invention as defined by the claims.

What is claimed is:

1. A method for providing stimulation therapy to a patient's brain using an implantable pulse generator (IPG) connected to one or more electrode leads implanted in the patient's brain, wherein each electrode lead comprises a plurality of electrodes, the method comprising:
   using stimulation circuitry of the IPG to cause a first one or more of the plurality of electrodes to provide electrical stimulation to the patient's brain, using sensing circuitry of the IPG to record evoked potentials (EPs) using a second one or more of the plurality of electrodes, and using control circuitry of the IPG to:
extract one or more EP features of the recorded EPs,
use a network activation model to estimate a network activation value based on the extracted one or more EP features, wherein the network activation value is indicative of an underlying state of activity in the patient's brain, and
use the network activation value to adjust the stimulation, using the network activation model to predict a change in the extracted one or more EP features that will result from the adjustment of the stimulation, using the network activation model to predict new EP features based on the adjustment to the stimulation, recording new EPs following the adjustment to the stimulation, extracting one or more features of the recorded new EPs, comparing the extracted one or more features of the recorded new EPs to the new EP features predicted by the activation model, and adjusting the network activation model based on the comparison.

2. The method of claim 1, wherein using the network activation value to adjust the stimulation comprises adjusting the stimulation to maintain the network activation value within a predetermined range of values.

3. The method of claim 2, wherein using the network activation value to adjust the stimulation comprises using a control algorithm to provide an adjustment to the stimulation based on the network activation value.

4. The method of claim 1, wherein the network activation model is a linear estimate derived from the extracted one or more EP features.

5. The method of claim 1, wherein the network activation model is a Kuramoto model.

6. The method of claim 1, wherein the network activation model is configured to estimate a wash in time of a change in the network activation value.

7. The method of claim 1, wherein the network activation model is configured to use the extracted one or more EP features and spontaneous potentials in the patient's brain to determine the network activation value.

8. The method of claim 7, further comprising using one or more of the plurality of electrodes to record spontaneous potentials in the patient's brain.

9. The method of claim 1, further comprising recording one or more side-effect signals indicative of a side effect of the stimulation and using the one or more side-effect signals to adjust the stimulation.

10. The method of claim 9, wherein the one or more signals indicative of a side effect comprise motor evoked potentials (MEPs).

11. The method of claim 9, wherein the one or more signals indicative of a side effect comprise signals indicative of internal capsule (IC) activation.

12. The method of claim 1, further comprising recording one or more sensor signals determined using one or more sensors and using the one or more sensor signals to adjust the stimulation.

13. The method of claim 12, wherein the one or more sensors comprise a motion sensor, a heart rate monitor, a breathing monitor, a sleep monitor, or a sleep sensor.

14. The method of claim 13, wherein the stimulation is adjusted to minimize power usage.

15. The method of claim 1, further comprising training the network activation model to estimate the network activation value based on the one or more features of the recorded EPs.

16. The method of claim 1, wherein the extracted one or more EP features comprise one or more of a frequency, delay, magnitude, and amplitude.

17. The method of claim 1, wherein the network activation model is configured within non-volatile memory of the IPG.

18. The method of claim 1, wherein the network activation model is configured within non-volatile memory of a remote controller for the IPG.

19. A method for providing stimulation therapy to a patient's brain using an implantable pulse generator (IPG) connected to one or more electrode leads implanted in the patient's brain, wherein each electrode lead comprises a plurality of electrodes, the method comprising:

using stimulation circuitry of the IPG to cause a first one or more of the plurality of electrodes to provide electrical stimulation to the patient's brain, using sensing circuitry of the IPG to record evoked potentials (EPs) using a second one or more of the plurality of electrodes, and using control circuitry of the IPG to:
extract one or more EP features of the recorded EPs,
use a network activation model to estimate a network activation value based on the extracted one or more EP features, wherein the network activation value is indicative of an underlying state of activity in the patient's brain, and
use the network activation value to adjust the stimulation, wherein the network activation model is a Kuramoto model.

20. A method for providing stimulation therapy to a patient's brain using an implantable pulse generator (IPG) connected to one or more electrode leads implanted in the patient's brain, wherein each electrode lead comprises a plurality of electrodes, the method comprising:

using stimulation circuitry of the IPG to cause a first one or more of the plurality of electrodes to provide electrical stimulation to the patient's brain, using sensing circuitry of the IPG to record evoked potentials (EPs) using a second one or more of the plurality of electrodes, and using control circuitry of the IPG to:
extract one or more EP features of the recorded EPs,
use a network activation model to estimate a network activation value based on the extracted one or more EP features, wherein the network activation value is indicative of an underlying state of activity in the patient's brain, and
use the network activation value to adjust the stimulation, wherein the network activation model is configured to estimate a wash in time of a change in the network activation value.

* * * * *